US010725420B2

(12) United States Patent
Tanaka et al.

(10) Patent No.: US 10,725,420 B2
(45) Date of Patent: Jul. 28, 2020

(54) IMAGE FORMING APPARATUS HAVING TONER AMOUNT SUPPRESSION CONTROL

(71) Applicants: Masato Tanaka, Tokyo (JP); Keiji Kunimi, Kanagawa (JP); Masaki Yoshino, Kanagawa (JP); Kazumi Suzuki, Shizuoka (JP)

(72) Inventors: Masato Tanaka, Tokyo (JP); Keiji Kunimi, Kanagawa (JP); Masaki Yoshino, Kanagawa (JP); Kazumi Suzuki, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/226,788

(22) Filed: Dec. 20, 2018

(65) Prior Publication Data

US 2019/0196362 A1 Jun. 27, 2019

(30) Foreign Application Priority Data

Dec. 27, 2017 (JP) ................................. 2017-252319
Sep. 27, 2018 (JP) ................................. 2018-182314

(51) Int. Cl.
*G03G 15/00* (2006.01)
*G03B 21/04* (2006.01)
(Continued)

(52) U.S. Cl.
CPC ..... *G03G 15/6585* (2013.01); *G03G 15/5041* (2013.01); *G03G 21/046* (2013.01)

(58) Field of Classification Search
CPC ..................... G03G 15/6585; G03G 15/04018
See application file for complete search history.

(56) References Cited

U.S. PATENT DOCUMENTS 8,488,218 B2 * 7/2013 Ota .................... H04N 1/00795 358/474
8,655,206 B2 * 2/2014 Kobayashi ......... G03G 15/5012 399/40

(Continued)

FOREIGN PATENT DOCUMENTS

JP 7-053945 2/1995
JP 7-271081 10/1995

(Continued)

OTHER PUBLICATIONS

Extended European Search Report dated May 13, 2019.
Office Action for European Patent Application No. 18214741.3 dated Feb. 11, 2020.

*Primary Examiner* — Walter L Lindsay, Jr.
*Assistant Examiner* — Arlene Heredia
(74) *Attorney, Agent, or Firm* — Harness, Dickey & Pierce, P.L.C.

(57) ABSTRACT

An image forming apparatus including an image forming unit, a fixing device, and circuitry is provided. The image forming unit is configured to perform a special image forming operation that forms a color toner image and a special toner image with a color toner and a special toner, respectively, on a recording medium and a normal image forming operation that forms the color toner image without forming the special toner image on the recording medium. The fixing device is configured to fix the color toner image and the special toner image on the recording medium. The circuitry is configured to perform, in the special image forming operation, a toner amount suppression control that makes an amount of the color toner on the recording medium per unit area smaller than that in the normal image forming operation.

18 Claims, 7 Drawing Sheets

(51) Int. Cl.
*G03G 21/04* (2006.01)
*H04N 1/60* (2006.01)

(56) References Cited

U.S. PATENT DOCUMENTS

| | | | | |
|---|---|---|---|---|
| 8,728,696 | B2 * | 5/2014 | Yamada | G03G 9/0821 430/107.1 |
| 8,859,952 | B2 * | 10/2014 | Ito | G03G 15/5062 250/271 |
| 9,020,380 | B2 * | 4/2015 | Shida | G03G 15/5058 399/49 |
| 10,241,457 | B1 * | 3/2019 | Alexandrovich | G03G 15/5041 |
| 10,274,856 | B2 * | 4/2019 | Nakajima | G03G 21/18 |
| 2003/0186148 | A1 * | 10/2003 | Nakamura | G03G 9/08797 430/107.1 |
| 2008/0070142 | A1 * | 3/2008 | Furuki | G03G 9/0918 430/108.22 |
| 2009/0268216 | A1 | 10/2009 | Iinuma | |
| 2011/0086302 | A1 * | 4/2011 | Zhou | G03G 9/0804 430/105 |
| 2012/0134696 | A1 | 5/2012 | Kobayashi et al. | |
| 2013/0266347 | A1 | 10/2013 | Kubota et al. | |
| 2015/0010337 | A1 * | 1/2015 | Morinaga | G03G 15/2017 399/341 |
| 2018/0143571 | A1 * | 5/2018 | Takazawa | G03G 15/6582 |

FOREIGN PATENT DOCUMENTS

| | | | | |
|---|---|---|---|---|
| JP | 9-077507 | | 3/1997 | |
| JP | 9-104857 | | 4/1997 | |
| JP | 2001-265181 | | 9/2001 | |
| JP | 2001-294785 | | 10/2001 | |
| JP | 2002-146254 | | 5/2002 | |
| JP | 2003-186238 | | 7/2003 | |
| JP | 2007-003944 | | 1/2007 | |
| JP | 2007-171508 | | 7/2007 | |
| JP | 2008-076663 | | 4/2008 | |
| JP | 2010-113368 | | 5/2010 | |
| JP | 2012-032541 | | 2/2012 | |
| JP | 2016-158161 | | 9/2016 | |
| JP | 2018-060169 | | 4/2018 | |
| WO | WO-2005019941 | A1 * | 3/2005 | G03G 8/00 |
| WO | WO-2007/004411 | A1 | 1/2007 | |

* cited by examiner

TWO-COLOR SUPERIMPOSITION

ONE-COLOR SUPERIMPOSITION

IMAGE FORMING APPARATUS HAVING TONER AMOUNT SUPPRESSION CONTROL

CROSS-REFERENCE TO RELATED APPLICATIONS

This patent application is based on and claims priority pursuant to 35 U.S.C. § 119(a) to Japanese Patent Application Nos. 2017-252319 and 2018-182314, filed on Dec. 27, 2017 and Sep. 27, 2018, respectively, in the Japan Patent Office, the entire disclosure of each of which is hereby incorporated by reference herein.

BACKGROUND

Technical Field

The present disclosure relates to an image forming apparatus.

Description of the Related Art

Conventionally, an image forming apparatus is known that forms a color toner image and a special toner image with a color toner (yellow toner, magenta toner, and/or cyan toner) and a special toner, respectively, on the same recording medium based on input image information. The color toner image and the special toner image are then fixed on the recording medium by a fixing device equipped in the image forming apparatus.

In such a conventional image forming apparatus that forms an image with both a special toner (such as an infrared absorbing toner) and a color toner, the image forming operation including the fixing process is performed multiple times in a divided manner to suppress defective fixing. Therefore, there has been a drawback that it takes much time to form an image with the special toner and the color toner as compared with the case of forming an image without using any special toner (i.e., performing the image forming operation once).

SUMMARY

In accordance with some embodiments of the present invention, an image forming apparatus is provided. The image forming apparatus includes an image forming unit, a fixing device, and circuitry. The image forming unit contains a color toner comprising at least one of yellow toner, magenta toner, and cyan toner, and a special toner. The image forming unit is configured to perform: a special image forming operation that forms a color toner image and a special toner image with the color toner and the special toner, respectively, on a recording medium; and a normal image forming operation that forms the color toner image without forming the special toner image on the recording medium. The fixing device is configured to fix the color toner image and the special toner image on the recording medium. The circuitry is configured to perform, in the special image forming operation, a toner amount suppression control that makes an amount of the color toner on the recording medium per unit area smaller than that in the normal image forming operation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
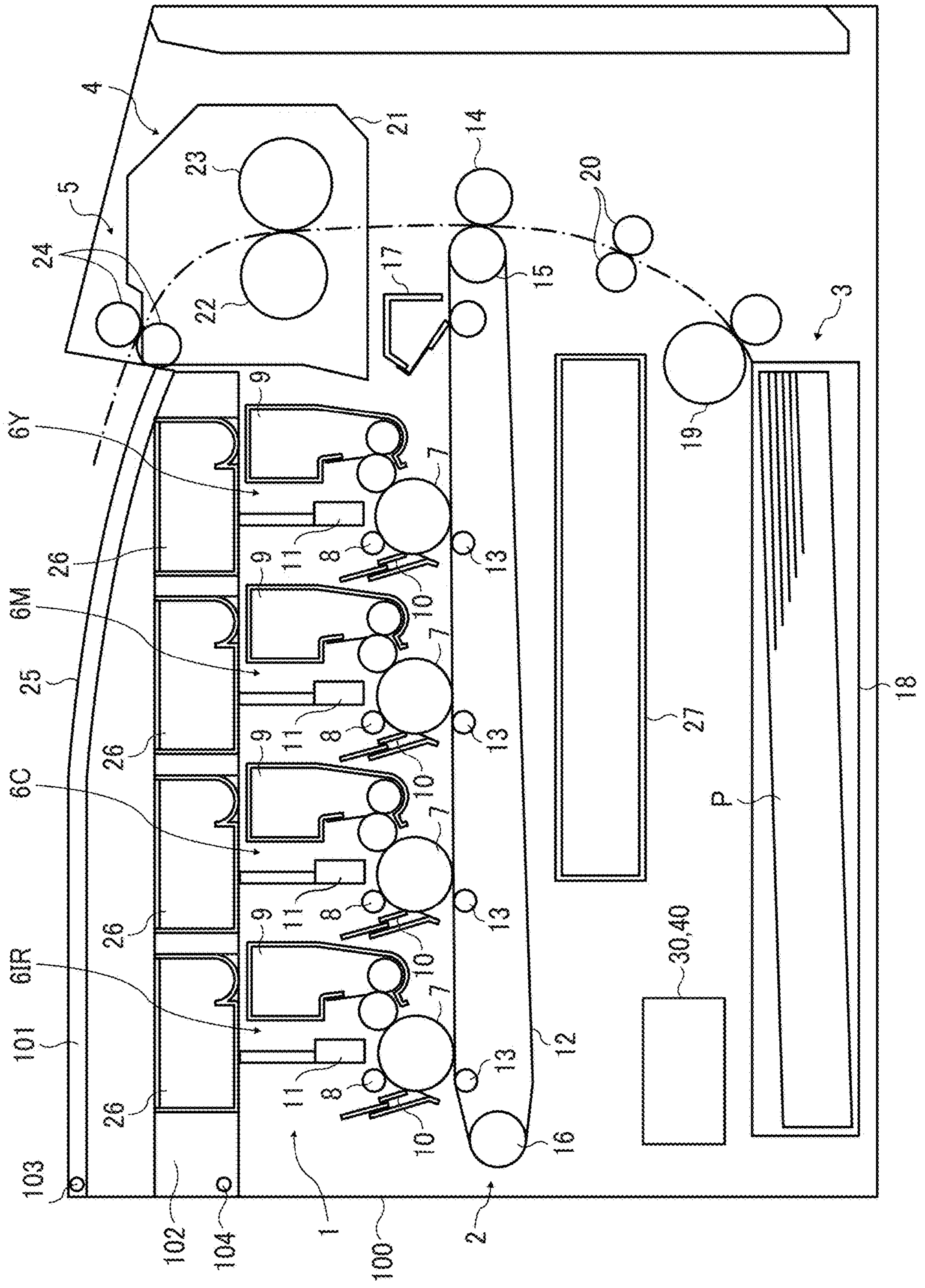
FIG. 1 is a schematic diagram of an image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, the time required for forming an image using a special toner and a color toner can be shortened.

A color printer (hereinafter "printer") that is an image forming apparatus according to an embodiment of the present invention is described with reference to the drawings.

The printer according to the present embodiment is an image forming apparatus having four stations or less. The image forming apparatus is not particularly limited as long as a color toner image formed with a color toner comprising at least one of yellow (Y) toner, magenta (M) toner, and cyan (C) toner and a special toner image formed with a special toner are formed on the same recording medium based on input image information and then fixed on the recording medium by a fixing device equipped in the image forming apparatus. Therefore, in addition to the printer, the image forming apparatus may be a copier, a facsimile machine, or a multifunction peripheral having at least two functions of a printer, a copier, a facsimile machine, and a scanner. The color toner may be a combination of multiple color toners among yellow, magenta, and cyan toners. Further, a toner image in which yellow, magenta, and cyan toners are superimposed to express black is of a color toner image.

The printer according to the present embodiment uses a non-visualized toner as the special toner. The non-visualized toner forms a hardly visible image that is difficult to recognize on a recording medium. Such a non-visualized toner is used, for example, for the purpose of preventing illegal copying, for forming a hardly visible image, called an invisible pattern or ground tint that is difficult to visually recognize, on a recording medium together with a normal image formed with a color toner to embed additional information in the resulting image. Examples of the non-visualized toner include, but are not limited to, toners capable of absorbing light outside the visible light region or emitting light within the visible light region upon irradiation with light outside the visible light region, such as an infrared absorbing toner having transparency and a transparent fluorescent toner which fluoresces when irradiated with ultraviolet rays. The non-visualized toner is a toner that forms an image having higher transparency than an image formed with general color toner under visible light. The toner according to the present embodiment easily becomes visible by emitting light or developing color upon a processing such as infrared light irradiation. Preferably, the non-visualized toner is a transparent toner that is suppressed from developing color under visible light. Also, the non-visualized toner has less colorant content than general color toner.

Here, the special toner is a toner having a color other than yellow, magenta, cyan, and black, or a transparent toner. The special toner also includes a white toner and a metallic toner.

In the present embodiment, an infrared absorbing toner is used as the non-visualized toner. In the following description, yellow toner, magenta toner, cyan toner, infrared absorbing toner are referred to as Y toner, M toner, C toner, and IR toner, respectively.

First, the overall configuration and operation of the printer according to the present embodiment is described below.

FIG. 1 is a schematic diagram illustrating the overall configuration of a printer according to the present embodiment.

The printer includes an image former 1, a transferrer 2, a recording medium supplier 3, a fixer 4, a recording medium ejector 5, a processor 30, and an image formation processor 40.

The image former 1 includes four process units 6Y, 6M, 6C, and 61R serving as image forming units. The process units 6Y, 6M, 6C, and 6IR have the same configuration except for containing different types of toners. Since no process unit containing black (K) toner is provided in the present embodiment, color images and monochrome images are formed using only Y, M, and C color toners. A process unit for K toner may be added, but the apparatus becomes large in this case.

Alternatively, the process unit 6IR for IR toner may be detachably configured so that the process unit for K toner is mountable in place of the process unit 61R for IR toner. In this case, when an image is formed without using IR toner, the process unit for K toner can be mounted to form a color image or a monochrome image by using Y, M, and C color toners and K toner.

Furthermore, all the process units may be detachably configured so that the mounting positions of the process units can be interchanged with each other. In this case, the positional relationship (in the toner image stacking direction) between an IR toner image and each color toner image on a recording medium can be appropriately switched by changing the position of the process unit for IR toner.

Each of the process units 6Y, 6M, 6C, and 61R includes a photoconductor 7 serving as a latent image bearer, a charging roller 8 serving as a charger to charge the surface of the photoconductor 7, a developing device 9 to develop the latent image on the photoconductor 7, and a photoconductor cleaner 10 to clean the surface of the photoconductor 7. On a position facing each photoconductor 7, an irradiator 11 to form a latent image on the surface of the photoconductor 7 is disposed. In the present embodiment, a light emitting diode (LED) unit is used as the irradiator 11. Alternatively, the irradiator 11 may be of a laser beam scanning type using a laser diode.

The transferrer 2 includes an intermediate transfer belt 12, multiple primary transfer rollers 13, a secondary transfer roller 14, and a belt cleaner 17. The intermediate transfer belt 12 is an endless belt onto which toner images on the photoconductors 7 are transferred. The primary transfer rollers 13 primarily transfer the toner images on the photoconductors 7 onto the intermediate transfer belt 12. The secondary transfer roller 14 secondarily transfers the toner images transferred onto the intermediate transfer belt 12 onto a recording medium. The belt cleaner 17 cleans the outer peripheral surface of the intermediate transfer belt 12.

The intermediate transfer belt 12 is stretched taut with a driving roller 15 and a driven roller 16 and rotates (circulates) as the driving roller 15 rotates. Each of the primary transfer rollers 13 is disposed so as to press the intermediate transfer belt 12 against respective photoconductors 7. As a result, a primary transfer nip where an image on each photoconductor 7 is transferred onto the intermediate transfer belt 12 is formed at a contact portion between the intermediate transfer belt 12 and each photoconductor 7. On the other hand, the secondary transfer roller 14 is disposed so as to contact a portion of the intermediate transfer belt 12 which is wound around the driving roller 15. A secondary transfer nip where an image on the intermediate transfer belt 12 is transferred onto a recording medium is formed at a position where the secondary transfer roller 14 and the intermediate transfer belt 12 contact each other.

The recording medium supplier 3 includes a sheet tray 18, a feed roller 19, and a timing roller pair 20. The sheet tray 18 stores a plurality of sheets P of paper serving as recording media. The feed roller 19 feeds the sheets P, one by one, from the sheet tray 18. The timing roller pair 20 feeds the sheet P fed by the feed roller 19 to the secondary transfer nip at a predetermined timing. The recording medium may be an overhead projector (OHP) transparency, OHP film, or cloth, in addition to paper. Examples of the paper include, but are not limited to, plain paper, thick paper, postcards, envelopes, thin paper, coated paper (art paper, etc.), uneven paper such as Japanese paper, and tracing paper.

The fixer 4 includes a fixing device 21 to fix an image on the sheet P. The fixing device 21 includes a fixing roller 22 and a pressure roller 23. The fixing roller 22 is heated by a heating source such as a heater. The pressure roller 23 is in contact with the fixing roller 22 at a predetermined pressure to form a fixing nip therebetween.

The recording medium ejector 5 includes an ejection roller pair 24 and an output tray 25. The ejection roller pair 24 ejects the sheet P fed from the fixing device 21 from the printer. The sheet P ejected by the ejection roller pair 24 is stacked on the output tray 25.

The processor 30 performs an image processing on image information input from a reading device (scanner), a personal computer, or the like, and controls the entire printer.

The image formation processor 40 controls image forming operations in each unit of the printer (e.g., the image former 1, the transferrer 2, the recording medium supplier 3, the fixer 4, and the recording medium ejector 5) under the control of the processor 30.

The printer further includes multiple toner cartridges 26 each serving as a powder container for storing toner used for image formation. Each toner cartridge 26 stores toner having the same color as that contained in the corresponding developing device 9. When the amount of toner stored in the developing device 9 falls below a predetermined amount, toner is supplied from the toner cartridge 26 to the developing device 9. The printer further includes a waste toner container 27 serving as another powder container independent from the toner cartridges 26. The waste toner container 27 stores waste toner collected by the belt cleaner 17 and the photoconductor cleaners 10.

As illustrated in FIG. 1, the printer includes a cover 101 for opening and closing the upper portion of a main body 100 of the printer (hereinafter "apparatus body 100"). The cover 101 is revolvable upward and downward about a revolving shaft 103 disposed in the apparatus body 100. Below the cover 101, a container holder 102 for detachably holding the four toner cartridges 26 is disposed. The container holder 102 is revolvable upward and downward about another revolving shaft 104 disposed in the apparatus body 100.

The process units 6Y, 6M, 6C, and 61R are disposed such that, on a recording medium, an IR toner image (special toner image) formed with IR toner is disposed closer to the recording medium than color toner images formed with Y, M, and C color toners are. Specifically, the IR process unit 6IR is arranged on the most downstream side and the color process units 6Y, 6M, and 6C are arranged on the upstream side thereof in the direction of moving of the intermediate transfer belt 12. That is, on the intermediate transfer belt 12, a Y toner image, an M toner image, a C toner image, and an IR toner image are stacked in this order from the intermediate transfer belt 12 side. On the other hand, after the secondary transfer, the IR toner image, the C toner image, the M toner image, and the Y toner image are stacked on the recording medium in this order from the recording medium side.

Since the IR toner image is formed to be closer to the recording medium than the color toner images are, the IR toner image is concealed behind the color toner images, reducing visibility. Thus, it is easy to secure concealability of the IR toner image. The arrangement position of the IR process unit 61R relative to the color process units 6Y, 6M, and 6C can be appropriately set. Further, as described above, in a case in which the mounting positions of the process units 6Y, 6M, 6C, and 61R are interchangeable with each other, the position of the IR process unit can be freely exchanged.

In the present embodiment, the printer adjusts deposition amount per unit area of each of Y, M, C, and IR toners to adjust image density of each toner. Specifically, the printer is provided with a toner deposition amount detection sensor that detects toner deposition amount in test images (i.e., multiple toner patches formed to have different target densities) of each of Y, M, C and IR toners formed on the intermediate transfer belt 12. Based on the results detected by the toner deposition amount detection sensor, image forming conditions in each of the Y, M, C and IR process units are adjusted so that a desired amount of toner is deposited to achieve a desired density.

The toner deposition amount detection sensor may be commonly used for each of the test images of Y, M, C, and IR toners, or may be individually provided for each of the test images of Y, M, C, and IR toners. In the present embodiment, the toner deposition amount detection sensor is an optical image density sensor that detects toner deposition amount (image density) of each test image by acquiring both specular reflection light and diffuse reflection light. The IR toner of the present embodiment becomes invisible (i.e., becomes an image that is difficult to visually observe or an image substantially having no absorption peak within the visible light region) after the fixing process. However, before the fixing process, the IR toner remains visible (i.e., remains an image that is visually observable or an image substantially having an absorption peak within the visible light region) on the intermediate transfer belt 12. Therefore, the toner deposition amount detection sensor used for C, M, and Y toners can also be used for IR toner. In detecting toner deposition amount in the test image of IR toner, it is preferable to acquire both specular reflection light and diffuse reflection light, rather than acquiring only specular reflection light, for higher detection accuracy.

Next, basic operations of the printer of the present embodiment is described below.

When an image forming operation is started, each photoconductor 7 is rotationally driven, and the charging roller 8 uniformly charges the surface of each photoconductor 7 to a predetermined polarity. Next, based on image information input from a reading device (scanner), a personal computer, or the like, the irradiator 11 irradiates the charged surface of each photoconductor 7 with LED light (laser light) to form a latent image (electrostatic latent image) thereon.

The latent image is formed on each photoconductor 7 based on single-color image information obtained by decomposing a target full color image into Y, M, and C color information. More specifically, color information (RGB, YCM, etc.) of the input image information is converted and decomposed into color information expressed by Y, M, and C, using a color conversion decomposition table for converting and decomposing color information of the input image information into color information (YMC) for the printer, to generate single-color image information. The irradiators 11 for Y, M, and C form respective latent images on respective photoconductors 7 based on the respective image information of Y, M, and C colors.

Further, in the present embodiment, IR image information is created from additional information included in the input image information or added by the printer. The additional information included in the input image information may be information added by an application on a personal computer or added by a print driver on a personal computer. The irradiator 11 for IR forms an IR latent image on the photoconductor 7 in the IR process unit 61R based on the IR image information.

The latent images of Y, C, M, and IR formed on the respective photoconductors 7 are supplied with toner from the respective developing devices 9 to be developed into respective toner images of Y, C, M, and IR. The toner images on the photoconductors 7 are sequentially superimposed and transferred onto the intermediate transfer belt 12 that travels around. Specifically, upon reaching the position of the primary transfer nip, each toner image on each photoconductor 7 is sequentially transferred onto the intermediate transfer belt 12 by a transfer electric field formed due to application of a predetermined voltage to the primary transfer roller 13. Thus, a full-color toner image (visible image) composed of Y, C, and M toners and an IR toner image (invisible image) composed of IR toner are formed on the surface of the intermediate transfer belt 12. Residual toner particles remaining on the photoconductor 7 failed to be transferred onto the intermediate transfer belt 12 are removed by the photoconductor cleaner 10.

On the other hand, when the image forming operation is started, the feed roller 19 starts rotating to feed the sheet P from the sheet tray 18. Conveyance of the sheet P is temporarily stopped by the timing roller pair 20. The timing roller pair 20 restarts rotating to convey the sheet P to the secondary transfer nip in synchronization with an entry of the toner images on the intermediate transfer belt 12 into the secondary transfer nip.

At the time when the sheet P is conveyed to the secondary transfer nip, the secondary transfer roller 14 is applied with a predetermined voltage so that a transfer electric field is formed in the secondary transfer nip. The toner images on the intermediate transfer belt 12 are collectively transferred onto the sheet P by the transfer electric field formed in the secondary transfer nip. At this time, toner particles remaining on the intermediate transfer belt 12 are removed by the belt cleaner 17.

The sheet P is then conveyed to the fixing device 21. The fixing roller 22 and the pressure roller 23 heat and pressurize the toner image to fix the toner image on the sheet P. The ejection roller pair 24 ejects the sheet P from the printer onto the output tray 25.

The above description refers to an image forming operation for forming a full-color image. The printer is also capable of forming an image by operating only one of the four process units 6Y, 6M, 6C, and 6IR or by operating two or three of the four process units.

Next, control during a special image forming operation for forming both a color toner image and a special toner image is described below with reference to the drawings.

The following description refers to a case in which an IR image is formed based on IR image information which is included in the input image information as additional information, where color information of the input image information is RGB multivalued information. The additional information included in the input image information needs not be image information. In the case of non-image information, the processor 30 may execute an IR image generation program to generate IR image information from the additional information. Even when no additional information is included in the input image information, the processor 30 may generate IR image information according to user designation or the like.

Figure 2:
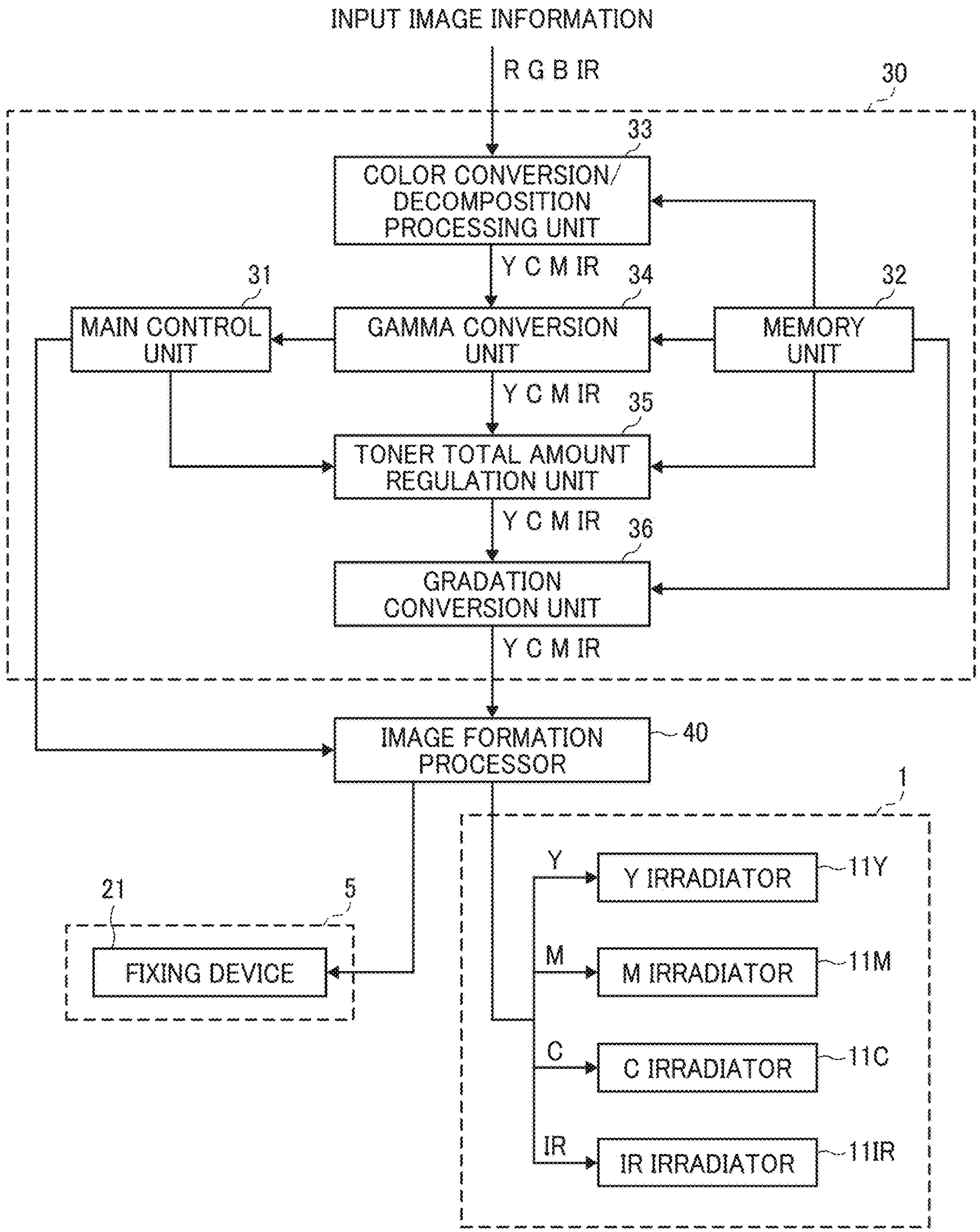
FIG. 2 is a block diagram of the main control in the image forming apparatus according to an embodiment of the present invention.

FIG. 2 is a block diagram of the main control in the printer according to the present embodiment.

The processor 30 includes a main control unit 31, a memory unit 32, a color conversion/decomposition processing unit 33, a gamma conversion unit 34, a toner total amount regulation unit 35, and a gradation conversion unit 36.

The main control unit 31 includes a central processing unit (CPU), a random access memory (RAM), and a read only memory (ROM), and executes various programs to perform image processing and overall control of the printer.

The memory unit 32 stores various data and programs to be used by each unit of the processor 30.

The color conversion/decomposition processing unit 33 converts and decomposes color information (RGB) of the input image information into color information of Y, M, and C for the printer, using a color conversion decomposition table stored in the memory unit 32, and generates image information of each of Y, M, and C colors. In a case in which IR image information is included in the input image information, IR image information is generated by being extracted from the input image information.

The gamma conversion unit 34 performs a γ (gamma) conversion processing, using a gamma conversion table stored in the memory unit 32, on the image information of each of Y, M, and C colors, and on the IR image information if necessary, to produce an appropriate gradation on a recording medium.

Under the control of the main control unit 31, the toner total amount regulation unit 35 performs a toner amount suppression control, using a toner deposition amount conversion table stored in the memory unit 32, at the time of a special image forming operation for creating both a color toner image and an IR toner image (special toner image), to reduce the amount of color toner per unit area as compared to that at the time of a normal image forming operation for creating the same color toner image only without forming the IR toner image. That is, in the present embodiment, the main control unit 31 and the toner total amount regulation unit 35 implement a controller that executes the toner amount suppression control.

Specifically, the toner total amount regulation unit 35 performs a toner deposition amount conversion processing (image processing), using the toner deposition amount conversion table stored in the memory unit 32, on the gamma-corrected (gamma-converted) image information of each of Y, M, and C colors, so that the total amount of Y, M, C, and IR toners (hereinafter "total amount of toner") deposited per unit area becomes equal to or less than the upper limit of the amount of toner that can be fixed (hereinafter "fixable amount of toner"). At this time, the toner deposition amount conversion processing (image processing) may also be performed on the IR image information.

The gradation conversion unit 36 performs a gradation conversion processing, using dither pattern data stored in the memory unit 32, to convert each of the Y, M, C, and IR image information into a dither pattern according to half tone density.

Figure 3:
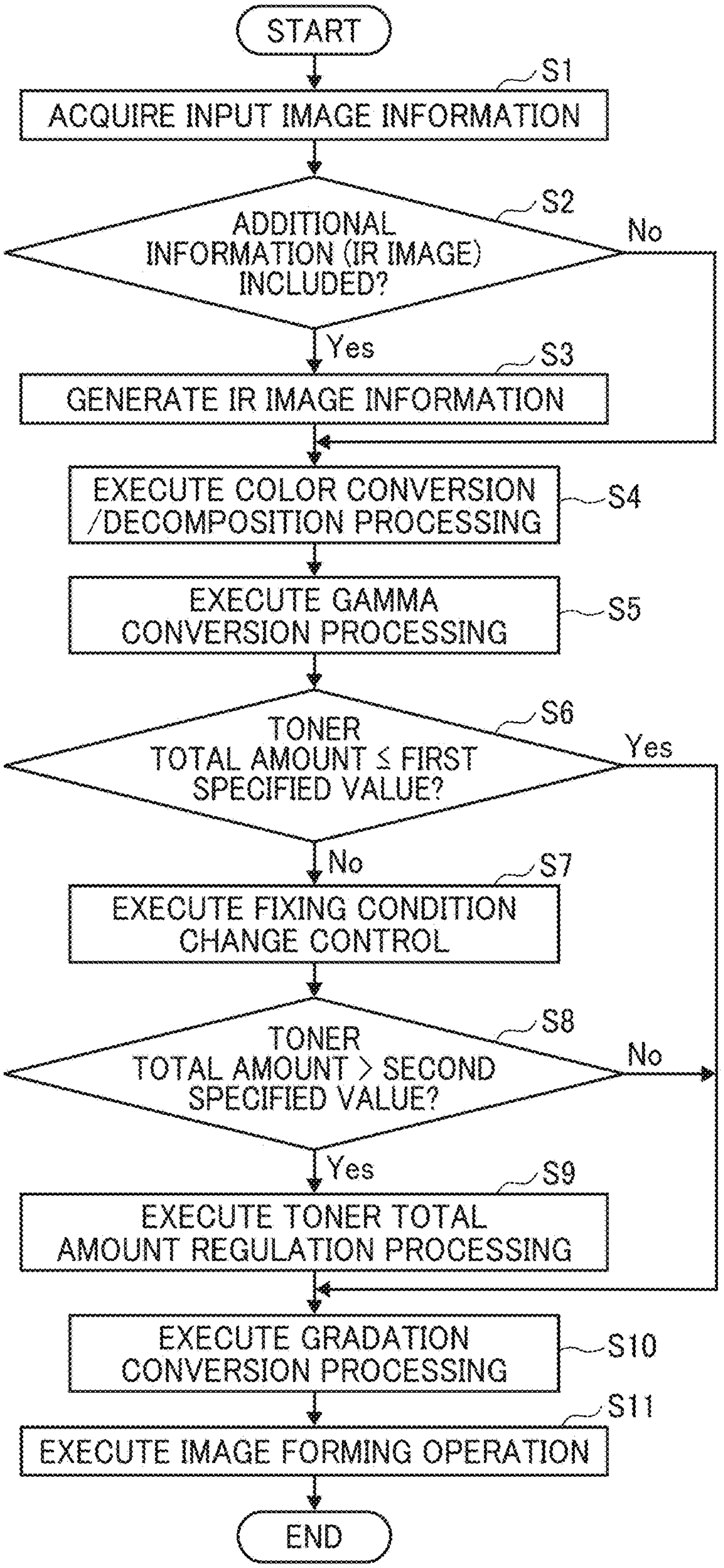
FIG. 3 is a flowchart of an image forming operation in the image forming apparatus according to an embodiment of the present invention.

FIG. 3 is a flowchart of the image forming operation in the present embodiment.

First, the processor 30 acquires image information input from a reading device (scanner), a personal computer, or the like (S1), and determines whether or not to generate IR image information. Next, whether or not additional information used for generating IR image information is included in the input image information is determined (S2). If it is determined that additional information is included in the input image information (Yes in S2), IR image information is generated based on the additional information (S3). In a case in which IR image information is included in the input image information, IR image information is generated by being extracted from the input image information.

Subsequently, the color conversion/decomposition processing unit 33 of the processor 30 converts and decomposes color information (RGB) of the input image information into color information of Y, M, and C for the printer, using a color conversion decomposition table stored in the memory unit 32 (S4). The the gamma conversion unit 34 then executes a gamma conversion processing on each of the Y, M, and C image information (S5). In a case in which IR image information has been generated in S3, the gamma conversion unit 34 executes a gamma conversion processing on the IR image information (S5).

Next, the main control unit 31 of the processor 30 determines whether or not an image based on the gamma-converted image information of Y, M, C, and IR contains a toner excess portion in which the total amount of toner per unit area exceeds a first specified value that is the upper limit of the amount of color toner at the time of the normal image forming operation (for forming an image without using the IR toner) (S6). This determination is performed only when it is determined in S2 that additional information (IR image information) is included in the input image information. That is, this determination only has to be performed during the special image forming operation and needs not be performed during the normal image forming operation.

FIGS. 4A to 4D are schematic diagrams illustrating toner images obtained by superimposing an IR toner image and Y, M, and C toner images with each other.

Figure 4A:
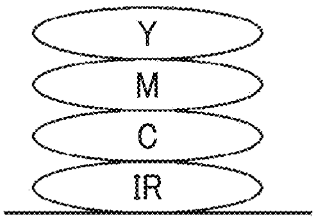
FIGS. 4A to 4D are schematic diagrams illustrating toner images obtained by superimposing an IR toner image and yellow (Y), magenta (M), and cyan (C) toner images with each other.
Figure 4B:
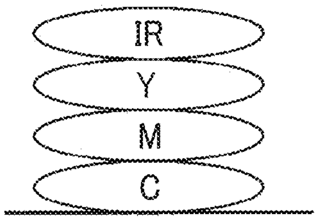
Figure 4C:
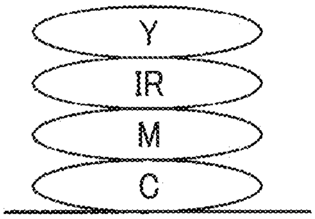
Figure 4D:
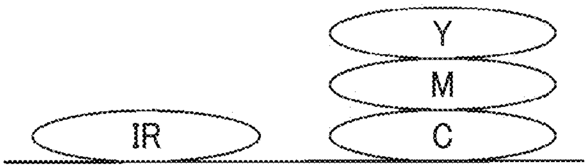

As illustrated in FIG. 4A, all the Y, M, and C toner images may be superimposed on the IR toner image. However, the resulting toner image is not limited to this configuration. For example, as illustrated in FIG. 4B, the IR toner image may be superimposed on the Y, M, and C toner images. Alternatively, as illustrated in FIG. 4C, the IR toner image may be sandwiched between the Y, M, and C toner images in a superimposed manner. In superimposing the IR toner image and the Y, M, and C toner images with each other, it is not necessary that the Y, M, and C toners are placed on the IR toner and, as illustrated in FIG. 4D, the Y, M, and C toners may be located at positions out of alignment with the IR toner. Method of superimposition may be appropriately selected by changing the arrangement order of the process units 6Y, 6M, 6C, and 61R. Although IR toner is taken as an example in the above description, other types of non-visualized toner such as white toner can also be used.

The first specified value for the total amount of toner per unit area may be set to 220% of the toner deposition amount of each color toner, when the target toner deposition amount in forming a single-color solid image is 100%. In the present embodiment, since no process unit for black (K) toner is provided, a black image portion is formed by superimposing Y, M, and C toner images, making the total amount of toner per unit area maximum at the black image portion. In the normal image forming operation, at the time of converting and decomposing color information (RGB) of the input image information into color information of Y, M, and C for the printer in the color conversion/decomposition processing (S4), even a black image portion is processed such that the total amount of toner per unit area becomes equal to or less than the first specified value (e.g., 220%), for example, such that the deposition amount of each of Y, M, and C toners becomes 70% (in this case, the total amount of toner becomes 210%). However, in a case in which an IR image is further superimposed on the black image portion, the total amount of toner per unit area may exceed the first specified value (e.g., 220%) in that portion. Incidentally, in a case in which an IR image is superimposed on an image portion with a relatively dark color, not limited to the black image portion, the total amount of toner may exceed the first specified value in some cases.

When it is determined that the toner excess portion in which the total amount of toner per unit area exceeds the first specified value is included (No in S6), the main control unit 31 executes a fixing condition change control (S7). More specifically, the main control unit 31 outputs a control command to the image formation processor 40 to increase the fixing ability of the fixing device 21 or to lengthen the fixing processing time by the fixing device 21, or both, than those at the time of the normal image forming operation.

The fixing ability of the fixing device 21 may be increased by, for example, increasing the fixing temperature or the fixing nip pressure. The fixing processing time by the fixing device 21 may be lengthened by, for example, lowering the conveying speed of the sheet P passing through the fixing device 21.

By changing the fixing conditions as described above, in the special image forming operation for creating IR image in addition to Y, M, and C images, the Y, M, C, and IR toner images can be fixed on the sheet P without causing fixing defect by merely passing the sheet P through the fixing device 21 one time, even when there is a toner excess portion in which the amount of toner exceeds the upper limit of the amount of color toner during the normal image forming operation.

However, if the fixing ability of the fixing device 21 is excessively increased or the fixing processing time by the fixing device 21 is excessively lengthened, the fixing processing becomes excessive for portions other than the toner excess portion, possibly causing unacceptable image quality deterioration. Further, when the total amount of toner becomes equal to or greater than a certain value, sufficient fixing may not be achieved by simply changing the fixing conditions.

As described above, in the normal image forming operation, at the time when converting and decomposing color information (RGB) of the input image information into color information of Y, M, and C for the printer in the color conversion/decomposition processing (S4), even a black image portion is processed such that the total amount of toner per unit area becomes equal to or less than the first specified value (e.g., 220%). However, in a case in which an IR image is further superimposed on the black image portion, for example, an IR toner image having a toner deposition amount of 100% is superimposed thereon, the total amount of toner per unit area may exceed a second specified value (e.g., 300%) at that portion. Incidentally, in a case in which an IR image is superimposed on an image portion with a relatively dark color, not limited to the black image portion, the total amount of toner may exceed the second specified value in some cases.

Therefore, in the present embodiment, the main control unit 31 determines whether or not an image based on the gamma-converted image information of Y, M, C, and IR contains an unfixable portion in which the total amount of toner per unit area exceeds the second specified value (e.g., 300%) that is the upper limit of the amount of toner fixable by one time of fixing processing (SS8). This determination is also performed only when it is determined in S2 that additional information (IR image information) is included in the input image information. That is, this determination only have to be performed during the special image forming operation and needs not be performed during the normal image forming operation.

When it is determined that the unfixable portion in which the total amount of toner per unit area exceeds the second specified value is included (Yes in SS8), the main control unit 31 causes the toner total amount regulation unit 35 to execute a toner total amount regulation processing as the toner amount suppression control (S9). In the toner total amount regulation processing according to the present embodiment, at the time of the special image forming operation for creating both a color toner image and an IR toner image, a toner deposition amount conversion processing (image processing) is performed on each of Y, M, and C image information to reduce the amount of color toner per unit area than that during the normal image forming operation for creating the same color toner image without forming the IR toner image.

In the toner total amount regulation processing, the gamma-corrected (gamma-converted) image information of each of Y, M, and C colors output from the gamma conversion unit 34 are converted, using the toner deposition amount conversion table stored in the memory unit 32, so as to reduce the toner deposition amount per unit area in each of Y, M, and C toner images and generate image information of each of Y, M, and C colors including no unfixable portion in which the total amount of toner per unit exceeds the second specified value.

Such a toner total amount regulation processing makes it possible to prevent that merely changing the fixing conditions makes the fixing process excessive or insufficient through one time of the fixing process.

The toner total amount regulation processing is not particularly limited as long as at least the total amount of toner at the unfixable portion can be reduced to a value not more than the second specified value that is the upper limit of the fixable amount of toner.

Therefore, it may be possible to execute a processing which converts a part of image information (corresponding only to the unfixable portion) such that the total amount of toner at the unfixable portion is reduced to a value not more than the second specified value that is the upper limit of the fixable amount of toner, so that the total amount of toner is reduced to a value not more than the second specified value only at the unfixable portion while the total amount of toner is maintained at the portion other than the unfixable portion.

Figure 5:
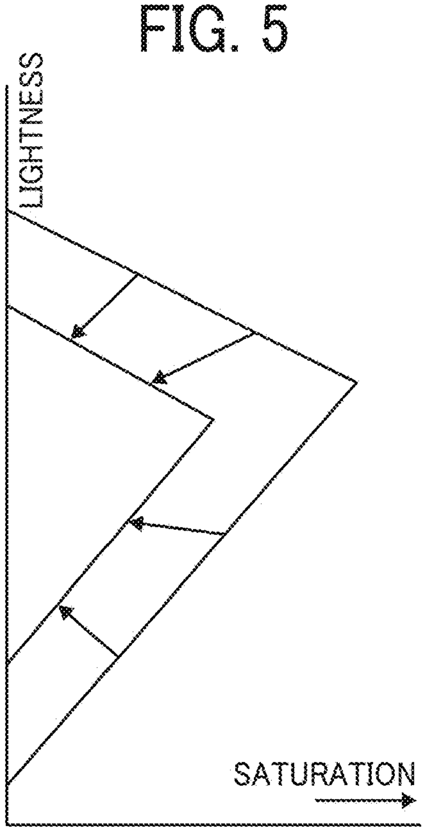
FIG. 5 is a chart for explaining a toner total amount regulation processing according to an embodiment of the present invention.

Further, the total amount of toner at the unfixable portion can be reduced to a value not more than the second specified value that is the upper limit of the fixable amount of toner by executing a processing that converts the entire of image information such that both lightness and saturation are overall compressed, as illustrated in FIG. 5 as an example of overall compression.

Figure 6:
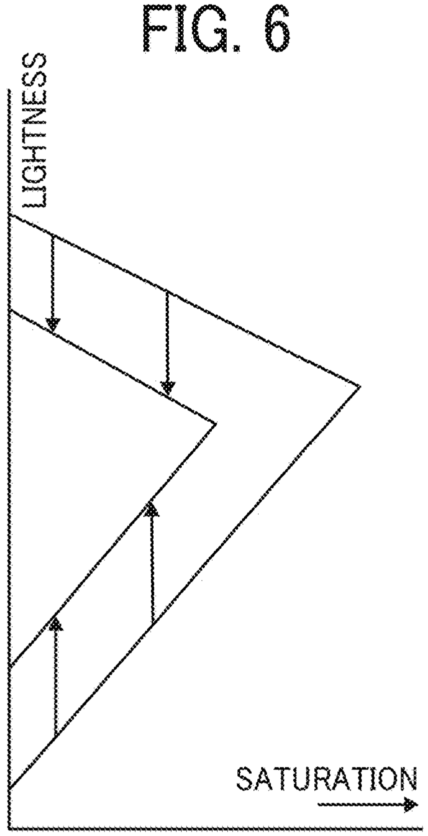
FIG. 6 is a chart for explaining a toner total amount regulation processing according to an embodiment of the present invention.

Further, the total amount of toner at the unfixable portion can be reduced to a value not more than the second specified value that is the upper limit of the fixable amount of toner by executing a processing that converts the entire of image information such that only lightness is compressed and saturation is unchanged, as illustrated in FIG. 6 as an example in which saturation is given importance.

Figure 7:
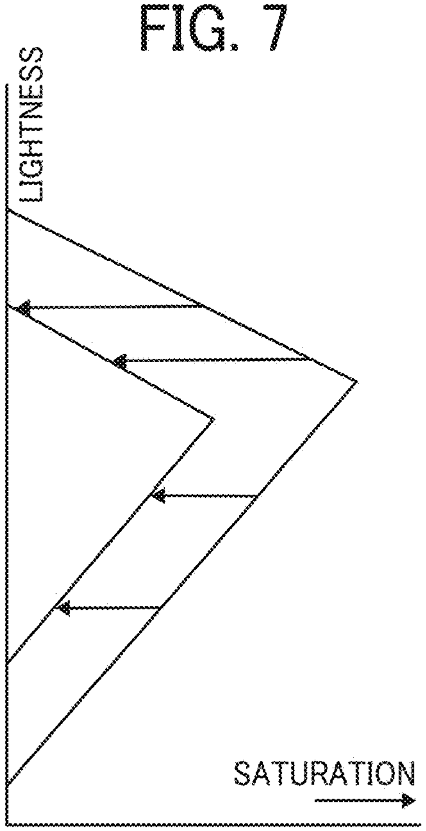
FIG. 7 is a chart for explaining a toner total amount regulation processing according to an embodiment of the present invention.

Further, the total amount of toner at the unfixable portion can be reduced to a value not more than the second specified value that is the upper limit of the fixable amount of toner by executing a processing that converts the entire of image information such that only saturation is compressed and lightness is unchanged, as illustrated in FIG. 7 as an example in which lightness is given importance.

Figure 8:
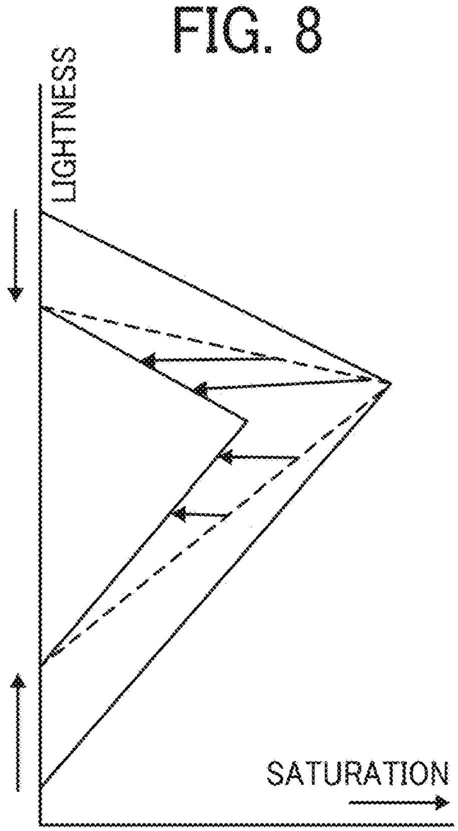
FIG. 8 is a chart for explaining a toner total amount regulation processing according to an embodiment of the present invention.

Further, the total amount of toner at the unfixable portion can be reduced to a value not more than the second specified value that is the upper limit of the fixable amount of toner by executing a processing that converts the entire of image information such that only saturation is compressed and lightness is unchanged, as illustrated in FIG. 8 as another example in which lightness is given importance.

In the present embodiment, when it is determined that additional information (IR image information) is not included in the input image information (No in S2), that is, at the time of the normal image forming operation, color information (RGB) of the input image information is converted and decomposed into color information of Y, M, and C (S4) and the gamma conversion processing is executed (S5), and the gradation conversion processing is thereafter executed by the gradation conversion unit 36 (S10). Each of the image information of Y. M, and C output from the gradation conversion unit 36 is thereafter transmitted to the image formation processor 40 and an image forming operation is executed under the normal fixing condition (S11).

The image formation processor 40 controls each of the irradiators 11 for Y, M, and C based on the respective image information of Y, M, and C to form respective latent images of Y, M, and C on the respective photoconductors 7. The image formation processor 40 controls each developing device 9 to develop each latent image with each toner to form each toner image, then controls each portion of the transferrer 2 to sequentially transfer the toner images on the intermediate transfer belt 12 and collectively transfer the toner images on the sheet P. The image formation processor 40 then controls the fixing device 21 to fix the toner image on the sheet P and ejects it out of the apparatus.

On the other hand, when it is determined that additional information (IR image information) is included in the input image information (Yes in S2), that is, at the time of the special image forming operation, the fixing condition change control and the toner total amount regulation processing as the toner amount suppression control are executed. More specifically, when the toner excess portion in which the total amount of toner per unit area exceeds the first specified value and not exceeds the second specified value is included (No in S5 S6, No in S8), the fixing condition change control is executed (S7) without executing the toner amount suppression control so as to suppress defective fixing even in one time of fixing processing.

On the other hand, in the special image forming operation, when the unfixable portion in which the total amount of toner per unit area exceeds both the first specified value and the second specified value is included (No in S6, Yes in S8), both the fixing condition change control (S7) and the toner amount suppression control (S9) are executed so as to suppress defective fixing in one time of fixing processing even in a situation where merely changing the fixing condition does not suppress defective fixing.

In the present embodiment, as described above, when the IR image is further superimposed on the black image portion, the total amount of toner per unit area exceeds the second specified value (e.g., 300%) in that portion, and the toner total amount regulation processing is executed. Therefore, in the printer of the present embodiment, the image density of a black image formed by superimposing an IR toner image on Y, M, and C color toner images is lower than that of a black image formed only with Y, M, and C color toner images.

In the present embodiment, at the time of the special image forming operation, only the fixing condition change control is executed according to the total toner amount, or both the fixing condition change control and the toner total amount regulation processing as the toner amount suppression control are executed. It is also possible that only the toner total amount regulation processing is executed without executing the fixing condition change control.

With respect to color conversion data for converting color information of the input image information into color information for the printer in the present embodiment, the color conversion decomposition table stored in the memory unit 32 is used as normal color conversion data at the time of the normal image forming operation, and both the color conversion decomposition table and the toner deposition amount conversion table stored in the memory unit 32 are used as special color conversion data at the time when the toner total amount regulation processing is performed as the toner amount suppression control.

In the present embodiment, whether or not to execute the fixing condition change control or the toner total amount regulation processing as the toner amount suppression control is determined depending on whether or not the total amount of toner exceeds the first specified value or the second specified value. However, the condition for determining whether or not to execute the fixing condition change control or the toner total amount regulation processing is not limited thereto. For example, the process can be simplified if the fixing condition change control and the toner total amount regulation processing are always executed when it is determined that the additional information (IR image information) is included in the input image information.

In the image forming apparatus according to the present embodiment, a one-dimensional code (bar code) is printed with normal granularity (106 lines/inch) when using IR toner. This is because the accuracy of reading one-dimensional codes becomes higher as the granularity thereof lowers. In particular, a solid image is used in general. In an actual behavior, in a mode for printing a one-dimensional code, a solid image is created at a screen ruling of 106 lines/inch, and in a mode (IR mode) for printing a figure (e.g., characters and symbols) which is not a one-dimensional code is created at a screen ruling of 30 lines/inch and an image area ratio of 5%.

Even in the IR mode, the image area ratio and granularity can be changed. Thus, the difficulty in viewing and the granularity can be adjusted or switched as necessary. For example, in a case in which it is more desirable to improve the degree of difficulty even if the granularity is lowered, it is preferable that the operator or the like can make adjustment or switching so as to lower the image area ratio to increase the granularity.

Visibility is changed according to superimposition of colors. For example, in the case of executing the IR mode only with IR toner, an IR toner image is formed with a screen ruling of 30 lines/inch and an image area ratio of 5%. As another example, in the case of superimposing two colors, an IR toner image is formed with a screen ruling of 10 lines/inch and an image area ratio of 5%. That is, an IR toner single color mode and a color superimposition mode exist. Superimposition of colors increases the difficulty in viewing. Therefore, when there is a large number of colors to be superimposed, the image area ratio of the IR image is maintained or lowered to increase granularity compared to a case in which there is a small number of colors to be superimposed.

Further, the image forming apparatus according to the present embodiment is set so as to print a normal color toner image with a preset screen ruling (default setting value) and to lower the screen ruling (by changing the granularity, spatial frequency, and number of isolated dots) when printing with IR toner. More specifically, in a color toner mode (first mode) in which only color toner is used for printing, a preset screen ruling is available. In an invisible toner mode (second mode) in which IR toner is used to lower visibility, a lowered screen ruling is available.

In the second mode for lowering visibility, the image area ratio is at least lower than that of the solid image. In the second mode for lowering visibility, both the image area ratio and the screen ruling are preset as default values. Alternatively, either one or both of which can be made changeable by the operator or the like. In this case, in the second mode for lowering visibility, it is preferable that the image area ratio is set to 50% or less and the screen ruling is set to 40 lines/inch or less as defaults. The image area ratio is set smaller than that of solid images.

Figure 9A:
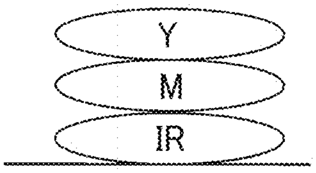
FIG. 9A is a schematic diagram illustrating a toner image in which two color toner images of yellow (Y) and magenta (M) are superimposed on an IR toner image.
Figure 9B:
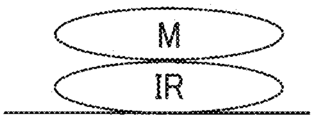
FIG. 9B is a schematic diagram illustrating a toner image in which one color toner image of magenta (M) is superimposed on an IR toner image.

The present embodiment has been described with reference to a case in which an IR toner image and three color toner images of Y, M, and C are superimposed with each other, but is not limited to that case. For example, each of the following cases are applicable: two color toner images of M and C are superimposed on an IR image; two color toner images of C and Y are superimposed on an IR image; two color toner images of Y and M are superimposed on an IR image; and one color toner image of Y, M, or C is superimposed with an IR image. FIG. 9A is a schematic diagram illustrating a case in which two color toner images of Y and M are superimposed on an IR toner image. FIG. 9B is a schematic diagram illustrating a case in which one color toner image of M is superimposed on an IR toner image.

Next, the toners used in the present embodiment are described in detail below.

The toner set used in the present embodiment includes at least one color toner and an IR toner as a special toner.

The color toner contains a binder resin and a colorant, and further contains other components as necessary.

The IR toner contains a binder resin and a near-infrared absorbing material, and further contains other components as necessary.

In the present embodiment, when a color toner image and an IR toner image (invisible toner image) are formed on the surface of a recording medium with a toner set that meets the following first or second preferred condition, the color toner image provides excellent visibility and the IR toner image provides highly-accurate readability when the color toner image is visually observed. First Condition: The toner set includes a color toner and an IR toner, and a 60-degree gloss value of a solid image of the IR toner is 30 or more and is 10 degrees or more higher than a 60-degree gloss value of a solid image of the color toner. Second Condition: The toner set includes a color toner and an IR toner, and a loss tangent (tan $\delta i$) of the IR toner is 2.5 or more at 100° C. to 140° C., and a loss tangent (tan $\delta c$) of the color toner is 2 or less at 100° C. to 140° C.

In recent years, there is an increasing demand for electrophotography to output relatively-low-gloss images to be differentiated from offset printing that outputs high-gloss images. Therefore, when the color toner has a high gloss, not only the secondary color or the tertiary color but also a portion where an invisible image (IR image) is superimposed, that is, a portion where a large amount of toner is deposited, has a high gloss, thereby causing a problem that the position of the IR image can be visually recognizable. Furthermore, in a case in which a color toner image is formed on an IR image, the superimposed color toner easily enters the IR toner layer when being heated and pressurized in the fixing nip, so that accuracy in reading information of the IR image by a machine becomes unstable.

IR Toner

The IR toner contains a binder resin and a near-infrared absorbing material, and further contains other components as necessary.

Binder Resin

The binder resin is not particularly limited, and any of conventionally known resins can be used. Examples of the binder resin include, but are not limited to, styrene-based resins such as styrene, α-methylstyrene, chlorostyrene, styrene-propylene copolymer, styrene-butadiene copolymer, styrene-vinyl chloride copolymer, styrene-vinyl acetate copolymer, styrene-maleic acid copolymer, styrene-acrylate copolymer, styrene-methacrylate copolymer, and styrene-acrylonitrile-acrylate copolymer, polyester resins, vinyl chloride resins, rosin-modified maleic acid resins, phenol resins, epoxy resins, polyethylene resins, polypropylene resins, ionomer resins, polyurethane resins, silicone resins, ketone resins, xylene resins, petroleum resins, and hydrogenated petroleum resins. Each of these materials can be used alone or in combination with others. Among these materials, styrene-based resins containing aromatic compounds as constitutional units and polyester resins are preferable, and polyester resins are more preferable.

The polyester resin may be obtained by a polycondensation reaction between commonly known alcohols and acids.

Specific examples of the alcohols include, but are not limited to: diols such as polyethylene glycol, diethylene glycol, triethylene glycol, 1,2-propylene glycol, 1,3-propylene glycol, 1,4-propylene glycol, neopentyl glycol, and 1,4-butenediol; etherified bisphenols such as 1,4-bis(hydroxymethyl)cyclohexane, bisphenol A, hydrogenated bisphenol A, polyoxyethylenated bisphenol A, and polyoxypropylenated bisphenol A; divalent alcohol monomers obtained by substituting the above compounds with a saturated or unsaturated hydrocarbon group having 3 to 22 carbon atoms; other divalent alcohol monomers; and alcohol monomers having 3 or higher valences such as sorbitol, 1,2,3,6-hexanetetraol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Each of these materials can be used alone or in combination with others.

The acids are not particularly limited and may be appropriately selected according to the purpose, but carboxylic acids are preferable.

Specific examples of the carboxylic acids include, but are not limited to: monocarboxylic acids such as palmitic acid, stearic acid, and oleic acid; maleic acid, fumaric acid, mesaconic acid, citraconic acid, terephthalic acid, cyclohexanedicarboxylic acid, succinic acid, adipic acid, sebacic acid, and malonic acid, and divalent organic acid monomers obtained by substituting these acids with a saturated or unsaturated hydrocarbon group having 3 to 22 carbon atoms; anhydrides of these acids; dimers of lower alkyl esters and linolenic acid; 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, and enpol trimer acid; and polyvalent carboxylic acid monomers having 3 or more valences such as anhydrides of the above acids. Each of these materials can be used alone or in combination with others.

The binder resin may contain a crystalline resin.

The crystalline resin is not particularly limited as long as it has crystallinity and can be appropriately selected according to the purpose. Examples of the crystalline resin include, but are not limited to, polyester resins, polyurethane resins, polyurea resins, polyamide resins, polyether resins, vinyl resins, and modified crystalline resins. Each of these materials can be used alone or in combination with others. Among these materials, polyester resins, polyurethane resins, polyurea resins, polyamide resins, and polyether resins are preferable. In particular, resins having at least one of a urethane backbone and a urea backbone are preferable for imparting moisture resistance and incompatibility with an amorphous resin (to be described later).

The crystalline resin preferably has a weight average molecular weight (Mw) of from 2,000 to 100,000, more preferably from 5,000 to 60,000, and most preferably from 8,000 to 30,000, for fixability. When the weight average molecular weight is 2,000 or more, deterioration of offset resistance can be prevented. When the weight average molecular weight is 100,000 or less, deterioration of low temperature fixability can be prevented.

Near-Infrared Absorbing Material

The near-infrared absorbing material may be either an inorganic material or an organic material.

Various infrared absorbing materials having transparency (i.e., being invisible) have been proposed for additional data embedding technology.

Examples of inorganic near-infrared absorbing materials include, but are not limited to, glass composed of a glass network forming component which transmits light in the visible range, such as phosphoric acid, silica, and boric acid, to which a transition metal ion, a coloring material composed of inorganic and/or organic compounds, or the like is added; and crystallized glass obtained by crystallizing the above glass by heat treatment. These inorganic materials can well reflect light in the visible range to provide invisible images.

Examples of organic near-infrared absorbing materials include, but are not limited to, colored materials such as phthalocyanine compounds and anthraquinone compounds; and colorless materials such as aluminum salt compounds and naphthalocyanine compounds. Among them, colorless materials are preferable because they do not cause coloring of an image. In addition, the addition amount thereof can be low because they sufficiently absorb infrared light with a small amount. As a result, the quality of the color image does not deteriorate.

Among such colorless materials, naphthalocyanine compounds are preferable because the absorbance thereof in the visible light region is very low, the characteristic thereof is nearly colorless, and the effect thereof on charging of the toner is small.

The naphthalocyanine compounds are not particularly limited and may be appropriately selected according to the purpose, but the compounds exemplified below are preferred.

Chemical Formula (1)

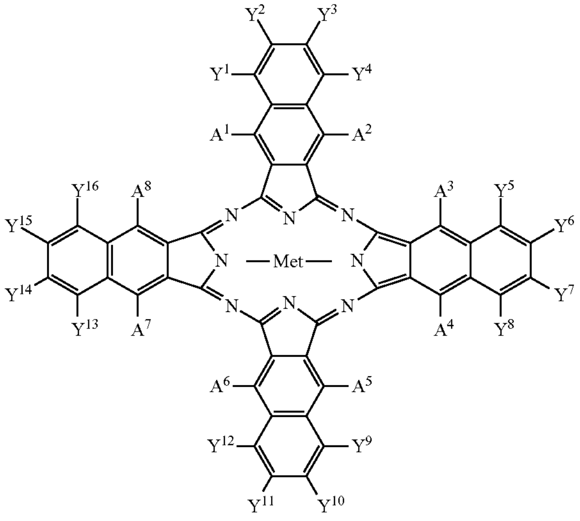

In the chemical formula (1), Met represents two hydrogen atoms, a divalent metal atom, or a trivalent or tetravalent substituted metal atom; each of $A^1$ to $A^8$ independently represents a hydrogen atom, a halogen atom, a substituted or unsubstituted alkyl group, a substituted or unsubstituted aryl group, a substituted or unsubstituted alkoxy group, a substituted or unsubstituted aryloxy group, a substituted or unsubstituted alkylthio group, or a substituted or unsubstituted arylthio group, where, in each of combinations of $A^1$ and $A^2$, $A^3$ and $A^4$, $A^5$ and $A^6$, and $A^7$ and $A^8$, both elements do not simultaneously represent a hydrogen atom or a halogen atom; and each of $Y^1$ to $Y^{16}$ independently represents a hydrogen atom, a halogen atom, a substituted or unsubstituted alkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted alkylamino group, a substituted or unsubstituted dialkylamino group, a substituted or unsubstituted arylamino group, a substituted or unsubstituted diarylamino group, a substituted or unsubstituted alkylarylamino group, a hydroxy group, a mercapto group, a nitro group, a nitrile group, an oxycarbonyl group, an alkoxycarbonyl group, an aryloxycarbonyl group, an aminocarbonyl group, or a mono- or di-substituted aminocarbonyl group.

The reflectance of the near-infrared absorbing material at a reading wavelength is preferably 50% or less for stable reading by a machine upon infrared light irradiation. When the reflectance is 50% or less, deterioration of reading accuracy can be prevented.

The reflectance may be measured from the output solid image using a spectrophotometer (e.g., V-660 manufactured by JASCO Corporation, eXact manufactured by X-Rite Inc.).

The near-infrared absorbing material is preferably dispersed in the toner particles.

In a case in which the near-infrared absorbing material is externally fixed on the surface of the toner particles or mixed in the toner particles, aggregation may occur in the toner particles or developer. Even in a case in which a necessary amount of the near-infrared absorbing material is added as a bulk, in the process of externally fixing it on the surface of the toner particles or preparing a developer, a part thereof is lost due to adhesion to equipment, causing lack or uneven distribution of the near-infrared absorbing material in the IR image. As a result, information cannot be read out accurately and stably. In addition, there is a possibility that free particles of the near-infrared absorbing material contaminate the interior, particularly a photoconductor, thereby adversely affecting other processes such as development and transfer processes.

In particular, the organic near-infrared absorbing material can be better dispersed in a binder resin than inorganic materials. Therefore, in the case of using the organic near-infrared absorbing material, it possible to record information at a high density since the organic near-infrared light absorbing material can be evenly dispersed in an IR image formed on an image output medium while showing sufficient absorptivity in the infrared region without impairing invisibility in the visible region. In addition, either reading of an IR image by a machine or decoding process can be stably performed for an extended period of time.

The content of the near-infrared absorbing material varies depending on the characteristics thereof. Regardless of the type of the near-infrared absorbing material, absorption of near-infrared light becomes insufficient if the content is insufficient. If absorption of near-infrared light is insufficient, a large amount of IR toner must be adhered to a medium such as paper. In this case, visible irregularities are produced due to generation of an aggregate (bulk) of IR toner as well as resources are wasted. When the content of the near-infrared absorbing material is excessive, the near-infrared absorbing material slightly absorbs light in the visible light wavelength region. As a result, disadvantageously, the near-infrared absorbing material becomes easily visually recognizable.

In the case of using vanadyl naphthalocyanine known to be used as a transparent (invisible) near-infrared absorbing material, the content thereof in the IR toner is preferably from 0.3% to 1.0% by mass.

Other Components

The other components are not particularly limited as long as they are contained in the toner and can be appropriately selected according to the purpose. Examples thereof include, but are not limited to, a release agent, a charge controlling agent, and an external additive.

Release Agent

Examples of the release agent include, but are not limited to, natural waxes and synthetic waxes. Each of these materials can be used alone or in combination with others.

Specific examples of the natural waxes include, but are not limited to: plant waxes such as carnauba wax, cotton wax, sumac wax, and rice wax; animal waxes such as bees wax and lanolin; mineral waxes such as ozokerite and ceresin; and petroleum waxes such as paraffin wax, microcrystalline wax, and petrolatum wax.

Specific examples of the synthetic waxes include, but are not limited to: synthetic hydrocarbon waxes such as Fischer-Tropsch wax and polyethylene wax; synthetic waxes such as esters, ketones, and ethers; fatty acid amides such as 1,2-hydroxystearic acid amide, stearic acid amide, phthalic anhydride imide, and chlorinated hydrocarbons; and crystalline polymers, such as homopolymers and copolymers of polyacrylates such as n-stearyl polymethacrylate and n-lauryl polymethacrylate (e.g., n-stearyl acrylate-ethyl methacrylate copolymer), which are low-molecular-weight crystalline polymers, having a long-chain alkyl group on its side chain.

Preferably, the release agent comprises a monoester wax. Since the monoester wax has low compatibility with general binder resins, the monoester wax easily exudes out to the surface of the toner when the toner is fixed. Thus, the toner exhibits high releasability while securing high gloss and sufficient low-temperature fixability.

Preferably, the monoester wax is of a synthetic ester wax. Examples of the synthetic ester wax include, but are not limited to, a monoester wax synthesized from a long-chain linear saturated fatty acid and a long-chain linear saturated alcohol. The long-chain linear saturated fatty acid is represented by the general formula $C_nH_{2n+1}COOH$, and n is preferably about 5 to 28. The long-chain linear saturated alcohol is represented by the general formula $C_nH_{2n+1}OH$, and n is preferably about 5 to 28.

Specific examples of the long-chain linear saturated fatty acid include, but are not limited to, capric acid, undecylic acid, lauric acid, tridecylic acid, myristic acid, pentadecylic acid, palmitic acid, heptadecanoic acid, tetradecanoic acid, stearic acid, nonadecanoic acid, behenic acid, lignoceric acid, cerotic acid, heptacosanoic acid, montanic acid, and melissic acid. Specific examples of the long-chain linear saturated alcohol include, but are not limited to, amyl alcohol, hexyl alcohol, heptyl alcohol, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, eicosyl alcohol, ceryl alcohol, and heptadecanol, all of which may have a substituent such as a lower alkyl group, amino group, and halogen.

Preferably, the release agent has a melting point of from 50° C. to 120° C. When the melting point of the release agent is in the above numerical range, the release agent can effectively act at the interface between a fixing roller and the toner, thereby improving high-temperature offset resistance of the toner without applying another release agent such as an oil to the fixing roller. Specifically, when the melting point is 50° C. or higher, deterioration of heat-resistant storage stability of the toner can be prevented. When the melting point is 120° C. or less, deterioration of cold offset resistance and paper winding on the fixing device, which may be caused when releasability is not developed at low temperatures, can be prevented.

The melting point of the release agent can be determined from the maximum endothermic peak measured by a differential scanning calorimeter TG-DSC system TAS-100 (manufactured by Rigaku Corporation).

The content of the release agent in the binder resin is preferably from 1% to 20% by mass, more preferably from 3% to 10% by mass. When the content is 1% by mass or more, deterioration of the offset preventing effect can be prevented. When the content is 20% by mass or less, deterioration of transferability and durability can be prevented.

The content of the monoester wax is preferably from 4 to 8 parts by mass, more preferably 5 to 7 parts by mass, based on 100 parts by mass of the IR toner. When the content is 4 parts by mass or more, exudation to the surface of the toner at the time of fixing will not become insufficient and deterioration of releasability, gloss value, low-temperature fixability, and high-temperature offset resistance can be prevented. When the content is 8 parts by mass or less, deterioration of storage stability and filming property (on a photoconductor, etc.) of the toner, which may be caused when the amount of release agent deposited on the surface of the toner is increased, can be prevented.

The toner according to the present embodiment preferably contains a wax dispersing agent. Preferably, the wax dispersing agent is a copolymer composition containing at least styrene, butyl acrylate, and acrylonitrile as monomers, or a polyethylene adduct of the copolymer composition.

The content of the wax dispersing agent is preferably 7 parts by mass or less based on 100 parts by mass of the IR toner. The wax dispersing agent has an effect of dispersing the wax in the toner, so that storage stability of the toner is reliably improved regardless of production method of the toner. In addition, the diameter of the wax is reduced due to the effect of the wax dispersing agent, so that the toner is suppressed from filming on a photoconductor, etc. When the content is 7 parts by mass or less, various undesirable phenomena can be prevented. For example, gloss decrease caused due to an increase of the amount of polyester-incompatible components is prevented. Also, decrease of low-temperature fixability and hot offset resistance caused due to insufficient exudation of the wax to the surface of the toner at the time of fixing is prevented, because excessive increase of dispersibility of the wax is prevented although filming resistance is improved.

Charge Controlling Agent

Specific examples of usable charge controlling agents include, but are not limited to, nigrosine dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, phosphor and phosphor-containing compounds, fluorine activators, metal salts of salicylic acid, and metal salts of salicylic acid derivatives. Each of these materials can be used alone or in combination with others.

These charge controlling agents are available either synthetically or commercially. Specific examples of commercially available products include, but are not limited to: BONTRON 03, BONTRON P-51, BONTRON S-34, E-82, E-84, and E-89 (all manufactured by Orient Chemical Industries Co., Ltd.); TP-302, TP-415, COPY CHARGE PSY VP2038, COPY BLUE PR, COPY CHARGE NEG VP2036, and COPY CHARGE NX VP434 (all manufactured by Hoechst AG); and LRA-901 and LR-147 (all manufactured by Japan Carlit Co., Ltd.).

The content of the charge controlling agent can be appropriately determined depending on the type of the binder resin, the presence or absence of an optional additive, and/or the toner production method including dispersing method, but is preferably from 0.1 to 5 parts by mass, more preferably from 0.2 to 2 parts by mass, based on 100 parts by mass of the binder resin. When the content is 5 parts by mass or less, deterioration of developer fluidity and/or image density can be prevented because the charge of the toner is not so large that the effect of the charge control agent is not reduced and the electrostatic force between the toner and the developing roller is not increased.

Among the above charge controlling agents, metal salts having 3 or more valences are capable of controlling thermal properties of the toner. By containing such a metal salt in the toner, a cross-linking reaction with an acidic group of the binder resin proceeds at the time of fixing to form a weak three-dimensional cross-linkage, whereby high temperature offset resistance is achieved while low-temperature fixability is maintained.

Examples of the metal salt include, but are not limited to, a metal salt of a salicylic acid derivative and a metal salt of acetylacetonate. The metal is not particularly limited as long as it is a polyvalent ionic metal having 3 or more valences, and can be appropriately selected according to the purpose. Examples thereof include iron, zirconium, aluminum, titanium, and nickel. Among them, metal compounds of salicylic acid having 3 or more valences are preferred.

Preferably, the content of the metal salt is in the range of from 0.5 to 2 parts by mass, more preferably from 0.5 to 1 parts by mass, based on 100 parts by mass of the IR toner. When the content is 0.5 parts by mass or more, deterioration of offset resistance can be prevented. When the content is 2 parts by mass or less, deterioration of gloss value can be prevented.

External Additive

The external additive may be contained in the toner to assist fluidity, developability, and chargeability of the toner. The external additive is not particularly limited and may be appropriately selected according to the purpose. Examples of the external additive include, but are not limited to, fine inorganic particles and fine polymeric particles.

Specific examples of the fine inorganic particles include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. Each of these materials can be used alone or in combination with others.

Specific examples of the fine polymeric particles include, but are not limited to, polystyrene particles obtained by soap-free emulsion polymerization, suspension polymerization, or dispersion polymerization; particles of copolymer of methacrylates and/or acrylates; particles of polycondensation polymer such as silicone, benzoguanamine, and nylon; and thermosetting resin particles.

The external additive may be surface-treated with a surface treatment agent to improve its hydrophobicity to prevent deterioration of fluidity and chargeability of the toner even under high-humidity conditions.

Specific examples of the surface treatment agent include, but are not limited to, silane coupling agents, silylation agents, silane coupling agents having a fluorinated alkyl group, organic titanate coupling agents, aluminum coupling agents, silicone oils, and modified silicone oils.

The external additive preferably has a primary particle diameter of from 5 nm to 2 μm, and more preferably from 5 nm to 500 μm. The external additive preferably has a specific surface area in the range of from 20 to 500 $m^2/g$ measured according to the BET method.

Preferably, the content of the external additive in the IR toner is from 0.01% to 5% by mass, more preferably from 0.01% to 2.0% by mass.

Cleanability Improving Agent

The cleanability improving agent may be contained in the toner to remove residual developer remaining on a photoconductor or primary transfer medium after image transfer. Specific examples of the cleanability improving agent include, but are not limited to: metal salts of fatty acids, such as zinc stearate and calcium stearate; and fine particles of polymers prepared by soap-free emulsion polymerization etc., such as fine polymethyl methacrylate particles and fine polystyrene particles. Preferably, the particle size distribution of the fine polymer particles is relatively narrow and the volume average particle diameter thereof is in the range of from 0.01 to 1 μm.

Color Toner

The color toner contains a binder resin and a colorant, and further contains other components as necessary. Examples of the other components include the same components exemplified above.

Preferably, the color toner is any one of a cyan toner, a magenta toner, and a yellow toner. More preferably, the color toner includes a cyan toner, a magenta toner, and a yellow toner. In other words, in the toner set, preferably, the 60-degree gloss value of a solid image of the IR toner is 10 degrees or more higher than the 60-degree gloss value of a solid image of any one of the cyan toner, magenta toner, and yellow toner. More preferably, the 60-degree gloss value of a solid image of the IR toner is 10 degrees or more higher than the 60-degree gloss value of solid images of all the cyan, magenta, and yellow toners.

Binder Resin

A toner image formed by the color toner according to the present embodiment preferably has a gloss value lower than that of general offset printed matter.

Therefore, the binder resin contained in the color toner preferably contains gel, although the binder resin is not particularly limited and can be appropriately selected according to the purpose. The gel fraction in the binder resin is preferably in the range of from 0.5% to 20% by mass, more preferably from 1.0% to 10% by mass.

Even when no gel is contained, the binder resin of the color toner preferably contains a high molecular weight component having a weight average molecular weight Mwc of 100,000 or more, which is larger than the weight average molecular weight Mwi of the binder resin of the IR toner. When the weight average molecular weight Mwc of the binder resin of the color toner is larger than the weight average molecular weight Mwi of the binder resin of the IR toner, the resulting color image has a 60-degree gloss value of about 10 to 30, which has higher visibility than offset printed matter.

Colorant

As the colorant, those having a small absorption in a wavelength range of 800 nm or higher are preferable. Specific examples of such colorants include, but are not limited to, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarin Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, dioxane violet, Anthraquinone Violet, Chrome Green, zinc green, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, perylene black, perinone black, and mixtures thereof. Each of these materials can be used alone or in combination with others.

When the color toner is used as a process color toner, the following colorants are preferably used for each of cyan, magenta, and yellow toners.

For cyan toner, C.I. Pigment Blue 15:3 is preferable. For magenta toner, C.I. Pigment Red 122, C.I. Pigment Red 269, and C.I. Pigment Red 81:4 are preferable. For yellow toner, C.I. Pigment Yellow 74, C.I. Pigment Yellow 155, C.I. Pigment Yellow 180, and C.I. Pigment Yellow 185 are preferable. Each of these colorants can be used alone or in combination with others.

The absorbance of the colorant at 800 nm or more is preferably less than 0.05, more preferably less than 0.01. When the absorbance is less than 0.05, the color toner superimposed on the IR toner is prevented from inhibiting reading of information formed with IR toner.

The content of the colorant is preferably from 3% to 12% by mass, more preferably from 5% to 10% by mass, based on the total mass of the color toner of each color, although it depends on the coloring power of each colorant. When the content is 3% by mass or more, coloring power of the toner is sufficient, so that the amount of deposited toner will not be increased and waste of resources is prevented. When the content is 12% by mass or less, chargeability of the toner is not greatly affected, so that it will not become difficult to stably maintain the amount of toner charge.

Properties of IR Toner and Color Toner

The 60-degree gloss value of the solid image of the IR toner is 30 or more, preferably from 30 to 80, more preferably from 30 to 60. When the 60-degree gloss value of the solid image is less than 30, visibility of the IR toner image is increased and the IR toner image fails to function as a concealed image. When the 60-degree gloss value of the solid image is larger than 80, the molecular weight of the toner resin is small and it may be difficult to maintain a sufficient fixable temperature range.

The 60-degree gloss value of the solid image of the color toner is preferably in a range of from 10 to 40, more preferably from 15 to 35. When the gloss value is within the above numerical range, the color toner image has a relatively low gloss.

The 60-degree gloss value of the solid image of the IR toner is preferably 10 degrees or more higher, preferably 15 degrees or more higher, more preferably 20 degrees or more higher, than the 60-degree gloss value of the solid image of the color toner. When the difference between the 60-degree gloss value of the solid image of the IR toner and the 60-degree gloss value of the solid image of the color toner is less than 10, in the case of superimposing the color toner image on the IR toner image formed on an image output medium before image fixation is conducted, the color toner of the upper layer enters the lower IR toner layer by application of heat and pressure, resulting in deterioration of visibility of the color toner image. When the gloss value of the solid image of the IR toner is higher than the gloss value of the solid image of the color toner, visibility of the color toner image on the upper layer is improved. As a result, the IR toner image on the lower layer becomes difficult to visually recognize.

The absorbance of the solid image of the color toner at 800 nm or more is preferably less than 0.05, more preferably less than 0.01.

The gloss value of the solid image of each of the IR toner and the color toner can be adjusted by, for example, adjusting the gel fraction in the binder resin or adjusting the weight average molecular weight of the binder resin. The greater the gel fraction in the binder resin, the lower the gloss value. The closer the gel fraction to 0, the higher the gloss value. In a case in which the binder resin contains no gel, the greater the weight average molecular weight of the binder resin, the lower the gloss value. In addition, the smaller the weight average molecular weight, the higher the gloss value.

When the binder resin comprises a resin having an acid value, the gloss value can be adjusted by adding a metal salt having 3 or more valences thereto. As the acid value of the binder resin and the added amount of the metal salt increase, the gloss value is likely to become lower. As the acid value of the binder resin and the added amount of the metal salt decrease, the gloss value is likely to become higher.

The weight average molecular weight (Mwi) of IR toner is preferably from 6,000 to 12,000, more preferably from 7,500 to 10,000.

The weight average molecular weight can be determined from a molecular weight distribution of THF-soluble matter that is measured with a GPC (gel permeation chromatography) measuring instrument GPC-150C (manufactured by Waters Corporation).

For example, the weight average molecular weight can be measured using columns (SHODEX KF 801 to 807 manufactured by Showa Denko K.K.) as follows.

The columns are stabilized in a heat chamber at 40° C. A solvent tetrahydrofuran (THF) is let to flow in the columns at that temperature at a flow rate of 1 ml/min. Next, 0.05 g of a sample is thoroughly dissolved in 5 g of THF and thereafter filtered with a pretreatment filter (for example, a chromatographic disk having a pore size of 0.45 μm (manufactured by KURABO INDUSTRIES LTD.)), so that a THF solution of the sample having a sample concentration of from 0.05% to 0.6% by mass is prepared. The THF solution of the sample thus prepared in an amount of from 50 to 200 μL is injected in the measuring instrument.

The gel fraction in the IR toner is preferably from 0% to 2% by mass.

The gel fraction can be calculated from the dry weight of the component filtered by a pretreatment filter which was used in the measurement of weight average molecular weight.

The ratio (Mw/Mn) of the weight average molecular weight (Mw) to the number average molecular weight (Mn) of the IR toner is preferably 5 or less, more preferably 4 or less.

The weight average molecular weight (Mw) and the number average molecular weight (Mn) are determined by comparing the molecular weight distribution of the IR toner with a calibration curve that has been compiled with several types of monodisperse polystyrene standard samples. Specifically, the calibration curve shows the relation between the logarithmic values of molecular weights and the number of counts.

The polystyrene standard samples include, for example, those having molecular weights of $6\times10^2$, $2.1\times10^2$, $4\times10^2$, $1.75\times10^4$, $5.1\times10^4$, $1.1\times10^4$, $3.9\times10^5$, $8.6\times10^5$, $2\times10^6$, and $4.48\times10^6$, respectively (available from Pressure Chemical Company or Tosoh Corporation). Preferably, the calibration curve is prepared using at least 10 standard polystyrene samples. As the detector, a refractive index (RI) detector is used.

The acid value of the IR toner is preferably 12 mgKOH/g or less, more preferably from 6 to 12 mgKOH/g. The acid value can be adjusted to the above numerical range when the binder resin comprises a polyester resin. In this case, it is easy to achieve both low-temperature fixability and hot offset resistance.

The acid values of the toner and the binder resin in the present embodiment were measured under the following conditions in accordance with the measuring method described in JIS K 0070-1992.

First, a sample solution was prepared by dissolving 0.5 g (0.3 g in the case of ethyl acetate soluble component) of the toner or binder resin in 120 mL of toluene by stirring them at room temperature (23° C.) for about 10 hours. Further, 30 mL of ethanol is mixed therein, thus preparing a sample solution.

The acid value is calculated as follows using an instrument. Specifically, the sample solution was titrated with N/10 potassium hydroxide alcohol solution standardized in advance. The acid value was calculated from the consumed amount of the potassium hydroxide alcohol solution in the titration according to the following formula. Acid Value=KOH (mL)×N×56.1/Mass of Sample where N represents the factor of the N/10 potassium hydroxide alcohol solution.

In the following Examples and Comparative Examples, the acid value of the binder resin and the acid value of the toner were substantially the same. Therefore, the acid value of the binder resin is treated as the acid value of the toner in the present disclosure.

Particle Diameter of Toner

The weight average particle diameter of the IR toner is preferably from 5 to 7 μm, more preferably from 5 to 6 μm.

The weight average particle diameter of the color toner is preferably from 4 to 8 μm, more preferably from 5 to 7 μm.

When the weight average particle diameter is within the above range, fine dots with 600 dpi or more can be reproduced and high quality images can be obtained. This is because the particle diameter of the toner particles is sufficiently smaller than minute dots of a latent image and thus excellent dot reproducibility is exhibited.

Particularly, when the IR toner particles are arranged at high density after being transferred onto an image output medium before being fixed thereon so that the color toner particles to be superimposed thereon do not enter the gap between the IR toner particles, the resulting fixed image has high reproducibility. The image with high reproducibility can be read by a machine in a more stable manner upon infrared light irradiation.

When the weight average particle diameter (D4) of the color toner is 4 μm or more, undesirable phenomena such as reduction of transfer efficiency and deterioration of blade cleaning property can be prevented. When the weight average particle diameter (D4) of the color toner is 8 μm or less, undesirable phenomena can be prevented. For example, disturbance of image, caused when the color toner superimposed on an unfixed image gets in the image, can be prevented. In addition, it will not become difficult to prevent scattering of texts and lines.

The ratio (D4/D1) of the weight average particle diameter (D4) to the number average particle diameter (D1) is preferably from 1.00 to 1.40, more preferably from 1.05 to 1.30. The closer the ratio (D4/D1) to 1.00, the narrower the particle diameter distribution.

With such a toner having a small particle diameter and a narrow particle diameter distribution, since the charge amount distribution is uniform, a high-quality image with less background fog can be obtained. In addition, in an electrostatic transfer method, the transfer rate can be increased.

In a full-color image forming method for forming a multicolor image by superimposing toner images of different colors, compared to a monochrome image forming method for forming an image with only black toner without superimposing toner images of different colors, the amount of toner deposited on paper is larger.

That is, since the amount of toner to be developed, transferred, and fixed is increased, the above-described undesirable phenomena that deteriorate image quality, such as reduction of transfer efficiency, deterioration of blade cleaning property, scattering of texts and lines, and background fog, are likely to occur. Thus, the weight average particle diameter (D4) and the ratio (D4/D1) of the weight average particle diameter (D4) to the number average particle diameter (D1) are properly controlled.

The particle size distribution of toner particles can be measured using an apparatus for measuring the particle size distribution of toner particles by the Coulter principle. Examples of such an apparatus include, but are not limited to, COULTER COUNTER TA-II and COULTER MULTISIZER II (both manufactured by Beckman Coulter Inc.).

Specific measuring procedure is as follows.

First, 0.1 to 5 mL of a surfactant (e.g., an alkylbenzene sulfonate), as a dispersant, is added to 100 to 150 mL of an electrolyte solution. Here, the electrolyte solution is an about 1% NaCl aqueous solution prepared with the first grade sodium chloride. As the electrolyte solution, for example, ISOTON-II (available from Beckman Coulter, Inc.) can be used.

Further, 2 to 20 mg of a sample was added thereto. The electrolyte in which the sample is suspended is subjected to a dispersion treatment using an ultrasonic disperser for about 1 to 3 minutes and then to the measurement of the weight and number of toner particles using the above-described instrument equipped with a 100-μm aperture to calculate weight and number distributions. The weight average particle diameter (D4) and number average particle diameter (D1) of the toner can be calculated from the weight and number distributions obtained above.

Thirteen channels with the following ranges are used for the measurement: 2.00 or more and less than 2.52 μm; 2.52 or more and less than 3.17 μm; 3.17 or more and less than 4.00 μm; 4.00 or more and less than 5.04 μm; 5.04 or more and less than 6.35 μm; 6.35 or more and less than 8.00 μm; 8.00 or more and less than 10.08 μm; 10.08 or more and less than 12.70 μm; 12.70 or more and less than 16.00 μm; 16.00 or more and less than 20.20 μm; 20.20 or more and less than 25.40 μm; 25.40 or more and less than 32.00 μm; and 32.00 or more and less than 40.30 μm. Thus, particles having a particle diameter of 2.00 or more and less than 40.30 μm are to be measured.

It is generally known that the loss tangent (tan δ) of toner for electrophotographic development clearly correlates with the gloss value of an image formed with the toner. As tan δ increases, ductility of toner is increased at the time of fixing and substrate hiding property of toner is enhanced, so that a high gloss image is obtained.

Preferably, the loss tangent (tan δi) of the IR toner at 100° C. to 140° C. is 2.5 or more, more preferably 3.0 or more. In addition, preferably, tan δi is 15 or less. Here, a state in which the loss tangent (tan δi) of the IR toner at 100° C. to 140° C. is 2.5 or more refers to a state in which the loss tangent (tan δi) of the IR toner is always 2.5 or more in a temperature range of from 100° C. to 140° C.

Preferably, the loss tangent (tan δc) of the color toner is 2 or less. In addition, preferably, tan δc is 0.1 or more. When the loss tangent of the color toner is 2 or less, the color toner superimposed on the IR toner is prevented from entering the IR toner image, thus preventing deterioration of stability of the IR toner image. Here, a state in which the loss tangent (tan δc) of the color toner at 100° C. to 140° C. is 2 or less refers to a state in which the loss tangent (tan δc) of the color toner is always 2 or less in a temperature range of from 100° C. to 140° C.

The loss tangent (tan δ) of toner for electrophotographic development is represented by the ratio (G"/G') of the loss elastic modulus (G") to the storage elastic modulus (G') that can be determined by viscoelasticity measurement. For example, the loss elastic modulus (G") and the storage elastic modulus (G') can be measured by the following method. First, 0.8 g of the IR toner or color toner is molded using a die having a diameter of 20 mm at a pressure of 30 MPa. The molded toner is subjected to a measurement of loss elastic modulus (G"), storage elastic modulus (G'), and loss tangent (tan δ) using an instrument ADVANCED RHEOMETRIC EXPANSION SYSTEM (manufactured by TA Instruments) equipped with a parallel cone having a diameter of 20 mm under a frequency of 1.0 Hz, a temperature rising rate of 2.0° C./min, and a strain of 0.1% (under automatic strain control in which the allowable minimum stress is 1.0 g/cm, allowable maximum stress is 500 g/cm, maximum applied strain is 200%, and strain adjustment is 200%). GAP is set within a range such that FORCE becomes 0 to 100 gm after the sample is set.

Toner Production Method

The toners of the toner set according to the present embodiment may be produced by conventionally known methods such as melt-kneading-pulverization methods and polymerization methods. The color toner and the IR toner may be produced by either the same production method or different production methods. For example, it is possible that the color toner is produced by a polymerization method and the IR toner is produced by a melt-kneading-pulverization method.

Melt-Kneading-Pulverization Method

The melt-kneading-pulverization method includes the processes of (1) melt-kneading at least the binder resin, the colorant or the near-infrared absorbing material, and the release agent, (2) pulverizing/classifying the melt-kneaded toner composition, and (3) externally adding fine inorganic particles. It is preferable that fine powder produced in the pulverizing/classifying process (2) is reused as a raw material in the process (1) for saving cost.

Examples of kneaders used for the kneading include, but are not limited to, closed kneaders, single-screw or twin-screw extruders, and open-roll kneaders. Specific examples of the kneaders include, but are not limited to, KRC KNEADER (from Kurimoto, Ltd.); BUSS CO-KNEADER (from Buss AG); TWIN SCREW COMPOUNDER TEM (from Toshiba Machine Co., Ltd.); TWIN SCREW EXTRUDER TEX (from The Japan Steel Works, Ltd.); TWIN SCREW EXTRUDER PCM (from Ikegai Co., Ltd.); THREE ROLL MILL, MIXING ROLL MILL, and KNEADER (from Inoue Mfg., Inc.); KNEADEX (from Nippon Coke & Engineering Company, Limited); MS TYPE DISPERSION MIXER and KNEADER-RUDER (from Nihon Spindle Manufacturing Co., Ltd (formerly Moriyama Company Ltd.)), and BANBURY MIXER (from Kobe Steel, Ltd.).

Specific examples of pulverizers include, but are not limited to, COUNTER JET MILL, MICRON JET, and INOMIZER (from Hosokawa Micron Corporation); IDS-TYPE MILL and PJM JET MILL (from Nippon Pneumatic Mfg. Co., Ltd.); CROSS JET MILL (from Kurimoto, Ltd.); NSE-ULMAX (from Nisso Engineering Co., Ltd.); SK JET-O-MILL (from Seishin Enterprise Co., Ltd.); KRYPTRON (from Kawasaki Heavy Industries, Ltd.); TURBO MILL (from Freund-Turbo Corporation); and SUPER ROATER (from Nisshin Engineering Inc.).

Specific examples of classifiers include, but are not limited to, CLASSIEL, MICRON CLASSIFIER, and SPEDIC CLASSIFIER (from Seishin Enterprise Co., Ltd.); TURBO CLASSIFIER (from Nisshin Engineering Inc.); MICRON SEPARATOR, TURBOPLEX ATP, and TSP SEPARATOR (from Hosokawa Micron Corporation); ELBOW JET (from Nittetsu Mining Co., Ltd.); DISPERSION SEPARATOR (from Nippon Pneumatic Mfg. Co., Ltd.); and YM MICRO CUT (from URAS TECHNO CO., LTD. (formerly Yaskawa & Co., Ltd.)).

Specific examples of sieving devices for sieving coarse particles include, but are not limited to, ULTRASONIC (manufactured by Koei Sangyo Co., Ltd.); RESONASIEVE and GYRO-SIFTER (manufactured by Tokuju Corporation); VIBRASONIC SYSTEM (manufactured by DALTON CORPORATION); SONICLEAN (manufactured by SINTOKOGIO, LTD.), TURBO SCREENER (manufactured by FREUND-TURBO CORPORATION); MICRO SIFTER (manufactured by MAKINO MFG. CO., LTD.); and circular vibration sieves.

Polymerization Method

Examples of the polymerization method include conventionally known methods. The polymerization method may be conducted by the following procedure. First, the colorant, the binder resin, and the release agent are dispersed in an organic solvent to prepare a toner material liquid (oil phase). Preferably, a polyester prepolymer (A) having an isocyanate group is added to the toner material liquid and allowed to react during granulation so as to form a urea-modified polyester resin in the toner.

Next, the toner material liquid is emulsified in an aqueous medium in the presence of a surfactant and fine resin particles.

The aqueous medium comprises an aqueous solvent. The aqueous solvent may comprise water alone or an organic solvent such as an alcohol.

The used amount of the aqueous solvent is preferably from 50 to 2,000 parts by mass, more preferably from 100 to 1,000 parts by mass, based on 100 parts by mass of the toner material liquid.

The fine resin particles are not particularly limited and can be appropriately selected according to the purpose as long as they are capable of forming an aqueous dispersion thereof. Examples thereof include, but are not limited to, vinyl resins, polyurethane resins, epoxy resins, and polyester resins.

After the toner material liquid is emulsified (dispersed) in the aqueous medium, the emulsion (i.e., reactant) is subjected to removal of the organic solvent and subsequent washing and drying to obtain mother toner particles.

The IR toner and the color toner each can be used as a one-component developer or a two-component developer.

In a case in which the toner according to the present embodiment is used as a two-component developer, the toner is mixed with a magnetic carrier. The content of the toner in the developer is preferably from 1 to 10 parts by mass based on 100 parts by mass of the carrier.

Examples of the magnetic carrier include conventionally known materials such as iron powder, ferrite powder, magnetite powder, and magnetic resin carriers, each having a particle diameter of about 20 to 200 μm, but are not limited thereto.

Such magnetic carriers may be coated. Specific examples of coating materials for coating the magnetic carrier include, but are not limited to, amino resins (e.g., urea-formaldehyde resin, melamine resin, benzoguanamine resin, urea resin, polyamide resin, epoxy resin), polyvinyl and polyvinylidene resins (e.g., acrylic resin, polymethyl methacrylate resin, polyacrylonitrile resin, polyvinyl acetate resin, polyvinyl alcohol resin, polyvinyl butyral resin), styrene resins (e.g., polystyrene resin, styrene-acrylic copolymer resin), halogenated olefin resins (e.g., polyvinyl chloride), polyester resins (e.g., polyethylene terephthalate, polybutylene terephthalate), polycarbonate resins, polyethylene resins, polyvinyl fluoride resins, polyvinylidene fluoride resins, poly(trifluoroethylene) resins, poly(hexafluoropropylene) resins, vinylidene fluoride-acrylic copolymer, vinylidene fluoride-vinyl fluoride copolymer, tetrafluoroethylene-vinylidene fluoride-non-fluoride monomer terpolymer, and silicone resins.

The coating material may contain a conductive powder. Specific examples of the conductive powder include, but are not limited to, metal powder, carbon black, titanium oxide, tin oxide, and zinc oxide. Preferably, the conductive powder has an average particle diameter of 1 μm or less. When the average particle diameter is 1 μm or less, control of electric resistance will not become difficult.

Image Forming Apparatus and Image Forming Method

An image forming apparatus according to the present embodiment includes: an electrostatic latent image bearer; an electrostatic latent image forming device configured to form an electrostatic latent image on the electrostatic latent image bearer; a developing device containing an IR toner and a color toner, configured to develop the electrostatic latent image into an IR toner image or a color toner image with the IR toner or the color toner, respectively; a transfer device configured to transfer the toner image onto a recording medium; and a fixing device configured to fix the transferred image on the recording medium. The image forming apparatus may further include other devices as necessary.

An image forming method according to the present embodiment includes the processes of: forming an electrostatic latent image on an electrostatic latent image bearer; developing the electrostatic latent image into a toner image; transferring the toner image onto a recording medium; and fixing the transferred image on the recording medium. The image forming method may further include other processes as necessary.

The image forming method according to the present embodiment can be suitably conducted by the image forming apparatus according to the present embodiment.

In the image forming method and the image forming apparatus, the 60-degree gloss value of the solid image of the IR toner is 30 or more, preferably from 30 to 80, more preferably from 30 to 60.

In the image forming method and the image forming apparatus according to one embodiment, the 60-degree gloss value of the solid image of the IR toner is preferably 10 degrees or more higher, preferably 15 degrees or more higher, more preferably 20 degrees or more higher, than the 60-degree gloss value of the solid image of the color toner.

In the image forming method and the image forming apparatus according to another embodiment, the loss tangent (tan δi) of the IR toner at 100° to 140° C. is preferably 2.5 or more, more preferably 3.0 or more. In the image forming method and the image forming apparatus, preferably, the loss tangent (tan δc) of the color toner is 2 or less.

On the recording medium, it is preferable that the IR toner image is formed closer to the recording medium than the color toner image is. The IR toner image can be formed closer to the recording medium than the color toner image by, for example, forming the color toner image after the IR toner image is formed on the recording medium.

The number of color toners used for forming the color toner image is not particularly limited and can be appropriately selected according to the purpose. In the case of using a plurality of color toners, either a plurality of toner images may be formed at the same time or single color toner images may be repeatedly formed and superimposed on each other. Repeatedly forming single color toner images and superimposing them on each other is more preferred. In forming the color toner image, the order of forming each single color toner image is not particularly limited.

The deposition amount of the IR toner in the IR toner image is preferably from 0.30 to 0.45 $mg/cm^2$, more preferably from 0.35 to 0.40 $mg/cm^2$. When the deposition amount of the IR toner is 0.30 $mg/cm^2$ or more, the substrate hiding rate of the image is sufficient and a reliable image can be obtained.

In addition, since the near-infrared absorbing material has slight absorption in the visible light region and is not completely colorless, visibility increases as the amount of the near-infrared absorbing material added to the toner increases. Visibility can be reduced by setting the deposition amount of the IR toner to 0.45 $mg/cm^2$ or less.

The toner deposition amount per unit area of the color toner image superimposed on the IR toner image is preferably in a range of from 30% to 80%. When the toner deposition amount per unit area of the color toner image is within this numerical range, visibility of the IR toner image below the color toner image can be sufficiently lowered, which is preferable.

The reason for this can be considered as follows. The IR toner of the present embodiment has slight absorption in the visible light region, and therefore an image formed only of the IR toner is not completely transparent. Therefore, in order to make IR image information invisible (to make it difficult to visually recognize), it is preferable to mask the IR toner image with the color toner. When the toner deposition amount per unit area of the color toner image is 30% or more, the IR toner image is effectively prevented from being visually recognizable. When the toner deposition amount per unit area of the color toner image is less than 30%, visibility of the IR toner image is increased particularly when yellow toner is superimposed thereon.

An image forming method in which the toner deposition amount per unit area of the color toner image on the IR toner image is from 30% to 80% is effective particularly when an image is formed by superimposing two-dimensional code images. In a case in which an image is formed by superimposing a two-dimensional code image formed with the IR toner and another two-dimensional code image formed with the color toner, each containing different information, and is read by reading devices of different light wavelengths (860 nm and 532 nm), it is possible to embed more information in the image than in a two-dimensional code image formed only with the color toner.

On the recording medium, it is preferable that a two-dimensional code image (i) being the IR toner image is formed closer to the recording medium than another two-dimensional code image (c) being the color toner image is. In this case, the absorbance of the solid image of the color toner at from 800 to 900 nm is preferably less than 0.05, more preferably less than 0.01.

Also, it is preferable that the two-dimensional code image (i) and the two-dimensional code image (c) contain different information.

In a case in which a two-dimensional code image of the IR toner and another two-dimensional code image of the color toner are superimposed, the two-dimensional code image of the color toner may be a dummy code. In such a case, the two-dimensional code image of the IR toner cannot be visually recognized and information thereof can only be read by a two-dimensional code reader of infrared light. The two-dimensional code image of the color toner can be visually recognized but information thereof cannot be read by the two-dimensional code reader of infrared light.

EXAMPLES

Hereinafter, the toner used in the present embodiment will be described, but are not limited to these examples. In the following descriptions, "parts" represents "parts by mass" unless otherwise specified.

Production of IR Toner 1

Polyester Resin 1 (RN-306SF manufactured by Kao Corporation, having a weight average molecular weight Mw of 7,700 and an acid value of 4 mgKOH/g): 80 parts Polyester Resin 2 (RN-300SF manufactured by Kao Corporation, having a weight average molecular weight Mw of 11,000 and an acid value of 4 mgKOH/g): 10 parts Wax dispersant (EXD-001 manufactured by Sanyo Chemical Industries, Ltd.): 4 parts Monoester wax 1 (having a melting point mp of 70.5° C.): 6 parts Salicylic acid derivative zirconium salt A: 0.9 parts Vanadyl naphthalocyanine: 0.3 parts The vanadyl naphthalocyanine has the following structural formula (1) and was used as a near-infrared absorbing material. The salicylic acid derivative zirconium salt A has the following structural formula (2).

Structural Formula (1)

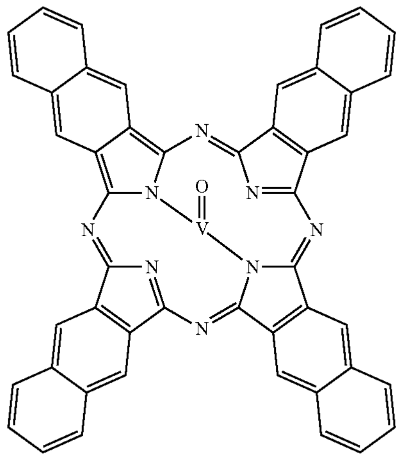

Structural Formula (2)

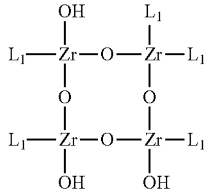

In the structural formula (2), $L_1$ represents the following structure.

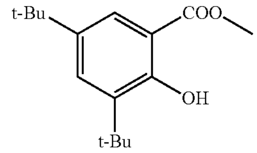

The toner raw materials listed above were preliminarily mixed by a HENSCHEL MIXER (FM20B available from NIPPON COKE & ENGINEERING CO., LTD.) and melt-kneaded by a single-shaft kneader (BUSS CO-KNEADER from Buss AG) at a temperature of from 100° C. to 130° C.

The kneaded product was cooled to room temperature and pulverized into coarse particles having a diameter of from 200 to 300 μm by a ROTOPLEX.

The coarse particles were further pulverized into fine particles having a weight average particle diameter of 4.5±0.3 μm by a COUNTER JET MILL (100AFG available from Hosokawa Micron Corporation) while appropriately adjusting the pulverization air pressure. The fine particles were classified by size using an air classifier (EJ-LABO available from MATSUBO Corporation) while appropriately adjusting the opening of the louver such that the weight average particle diameter became 5.2±0.2 μm and the ratio of weight average particle diameter to number average particle diameter became 1.20 or less. Thus, a mother toner 1 was prepared.

Subsequently, 100 parts of the mother toner 1 were mixed with additives including 1.3 parts of a fumed silica (ZD-30ST manufactured by Tokuyama Corporation), 1.5 parts of a fumed silica (UFP-35HH manufactured by Denka Company Limited), and 1.0 part of a titanium dioxide (MT-150AFM manufactured by Tayca Corporation) by a HENSCHEL MIXER, thus preparing an IR toner 1.

Production of IR Toner 2

An IR toner 2 was produced in the same manner as the IR toner 1 except for changing the amount of the vanadyl naphthalocyanine to 0.6 parts.

Production of IR Toner 3

An IR toner 3 was produced in the same manner as the IR toner 1 except for changing the amount of the vanadyl naphthalocyanine to 1.0 part.

Production of IR Toner 4

An IR Toner 4 was produced in the same manner as the IR Toner 2 except for replacing the polyester resin 2 with a polyester resin 3 (RN-290 SF manufactured by Kao Corporation, having an Mw of 87,000 and an acid value of 28 mgKOH/g).

The polyester resin 3 was synthesized from bisphenol A-polyethylene oxide addition alcohol, bisphenol A-ethylene oxide addition alcohol, fumaric acid, and trimellitic anhydride.

Production of IR Toner 5

An IR Toner 5 was produced in the same manner as the IR Toner 4 except for changing the amounts of the polyester resin 1 and the polyester resin 3 to 70 parts and 20 parts, respectively.

Production of IR Toner 6

A mother toner of an IR toner 6 was produced in the same manner as that of the IR toner 4 except for changing the amount of the vanadyl naphthalocyanine to 0.3 parts and changing the weight average particle diameter in the pulverization/classification process to 6.8±0.2 μm.

Subsequently, 100 parts of the mother toner were mixed with additives including 0.8 parts of a fumed silica (ZD-30ST manufactured by Tokuyama Corporation), 1.0 part of a fumed silica (UFP-35HH manufactured by Denka Company Limited), and 0.6 parts of a titanium dioxide (MT-150AFM manufactured by Tayca Corporation) by a HENSCHEL MIXER, thus preparing an IR toner 6.

Production of IR Toner 7

An IR toner 7 was produced in the same manner as the IR toner 6 except for changing the amount of the vanadyl naphthalocyanine to 0.6 parts.

Production of IR Toner 8

An IR toner 8 was produced in the same manner as the IR toner 5 except for changing the amount of the salicylic acid derivative zirconium salt A to 1.5 parts.

Production of IR Toner 9

A mother toner of an IR toner 9 was produced in the same manner as that of the IR toner 4 except for changing the weight average particle diameter in the pulverization/classification process to 8.0±0.2 μm.

Subsequently, 100 parts of the mother toner were mixed with additives including 0.6 parts of a fumed silica (ZD-30ST manufactured by Tokuyama Corporation), 0.8 parts of a fumed silica (UFP-35HH manufactured by Denka Company Limited), and 0.5 parts of a titanium dioxide (MT-150AFM manufactured by Tayca Corporation) by a HENSCHEL MIXER, thus preparing an IR toner 9.

Production of IR Toner 10

An IR toner 10 was produced in the same manner as the IR toner 1 except for changing the amount of the vanadyl naphthalocyanine to 0.2 parts.

Production of IR Toner 11

An IR toner 11 was produced in the same manner as the IR toner 4 except for changing the amount of the vanadyl naphthalocyanine to 1.2 parts.

Production of IR Toner 12

An IR Toner 12 was produced in the same manner as the IR Toner 4 except for changing the amounts of the polyester resin 1 and the polyester resin 3 to 60 parts and 30 parts, respectively.

Production of IR Toner 13

An IR toner 13 was produced in the same manner as the IR toner 6 except for replacing 0.3 parts of the vanadyl naphthalocyanine with 1.0 part of a near-infrared absorbing dye 1 (OPTLION NIR-761 manufactured by TOYOCOLOR CO., LTD.).

Production of IR Toner 14

An IR toner 14 was produced in the same manner as the IR toner 6 except for replacing 0.3 parts of the vanadyl naphthalocyanine with 2.0 parts of a near-infrared absorbing dye 1 (OPTLION NIR-761 manufactured by TOYOCOLOR CO., LTD.).

Production of Two-component Developer

Preparation of Carrier

Silicone resin (Organo straight silicone): 100 parts

Toluene: 100 parts

γ-(2-Aminoethyl) aminopropyl trimethoxysilane: 5 parts

Carbon black: 10 parts

The above materials were dispersed by a homomixer for 20 minutes to prepare a coating layer forming liquid. Manganese (Mn) ferrite particles having a weight average particle diameter of 35 μm, serving as core materials, were coated with the coating layer forming liquid using a fluidized bed coating device while controlling the temperature inside the fluidized bed to 70° C. The dried coating layer on the surface of the core material had an average film thickness of 0.20 μm. The core material having the coating layer was calcined in an electric furnace at 180° C. for 2 hours. Thus, a carrier was prepared.

Preparation of Developer (Two-Component Developer)

Each of the IR toners 1 to 14 and perylene black toners 1 to 2 was uniformly mixed with the carrier by a TURBULA MIXER (available from Willy A. Bachofen AG) at a revolution of 48 rpm for 5 minutes to be charged. Thus, developers 1 to 14 and perylene black developers 1 and 2 were each prepared.

The mixing ratio of the toner to the carrier was 5% by mass, which was equal to the initial toner concentration in the developer in the test machine.

Examples 1 to 12 and Comparative Examples 1 and 2

In a digital full-color multifunction peripheral IMAGIO NEO C600 manufactured by Ricoh Company, Ltd. (hereinafter "NEO C600") containing black developer, yellow developer, magenta developer, and cyan developer, the black developer was replaced with each of the two-component developers 1 to 14, so that the NEO C600 was equipped with a toner set including IR toner and color toners.

The absorbance of each of yellow, magenta, and cyan toners contained in the yellow, magenta, and cyan developers, respectively, at a wavelength of 800 nm or more was less than 0.01.

Measurement of Absorbance

A solid patch having a toner deposition amount of 0.5 $mg/cm^2$ was output on an OHP film (TYPE PPC-FC manufactured by Ricoh Company, Ltd.) by the NEO C600. The solid patch and a blank OHP film with no image were subjected to a measurement by a spectrophotometer (V-660DS manufactured by JASCO Corporation) to determine a spectral transmittance T within a range of from 800 to 900 nm. An absorbance A was calculated based on the above-obtained spectral transmittance T according to the following equation (1).

$$A=-\log T \quad (1)$$

Evaluation of Deposition Amount and Gloss Value

First, a solid patch of 5 cm×5 cm of each color toner was output on a paper sheet (TYPE 6000 (70 W) manufactured by Ricoh Co., Ltd.). The deposition amount and gloss value (60-degree gloss value) of the color toner in each patch are presented in Table 2.

Evaluation of Deposition Amount

After removing the fixing unit from the NEO C600, an unfixed solid patch of 5 cm×5 cm was output thereby. The solid patch was cut out with scissors into a cutout piece. The mass of the cutout piece was measured with a precision balance. After the toner in the solid patch portion (unfixed image portion) was blown off with an air gun, the mass of the cutout piece was measured again. The toner deposition amount was calculated from the mass of the cutout piece before and after the toner had been blown off by the air gun according to the following formula. The results are presented in Table 1.

Toner Deposition Amount ($mg/cm^2$)=((Mass of Cutout Piece with Solid Patch)−(Mass of Cutout Piece after Blowing of Toner))/25

Evaluation of Gloss Value

A fixed solid patch of 5 cm×5 cm outputted by the NEO C600 was subjected to a measurement of gloss value using a gloss meter (VGS-1D manufactured by Nippon Denshoku Industries Co., Ltd.) at four positions. The average value of the measurement results at the four positions was calculated and determined as a gloss value. The results are presented in Table 1.

Evaluation of Visibility and Readability

Visibility and readability were evaluated as follows.

Figure 10:
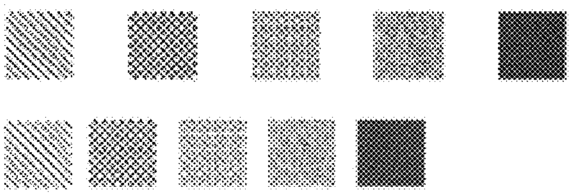
FIG. 10 is a diagram of patterns formed only of color toner images.
Figure 11:
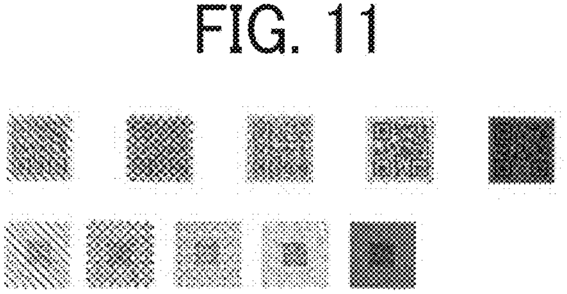
FIG. 11 is a diagram of patterns obtained by superimposing the patterns illustrated in FIG. 10 on IR toner images.

Using the apparatus and paper sheet presented in Table 3, QR codes (registered trademark) were printed with each IR toner, and patterns illustrated in FIG. 10 were further printed thereon, thus making the QR codes concealed by the patterns as illustrated in FIG. 11.

Figure 12:
FIG. 12 is a diagram of an image obtained by superimposing a color toner image on an IR toner image.

An image illustrated in FIG. 12 contains an image portion A and an image portion B. The image portion A is an entirely colored portion in which a QR code (registered trademark) is printed with an IR toner. The image portion B contains a QR code printed with a color toner and another QR code (registered trademark) printed with an IR toner below the QR code printed with the color toner, each containing different information.

Visibility of the IR toner image and readability of the QR code (registered trademark) in the image outputted with the IR toner were evaluated from the printed matter of FIGS. 11 and 12. The results are presented in Table 3. It is to be noted that invisible IR toner images are drawn visualized in FIG. 11 for the purpose of explanation.

Evaluation of Visibility

Visibility was ranked by the number of persons, among 20 randomly extracted monitors, who were able to visually recognize the QR code (registered trademark) formed of IR image in the printed matter of FIG. 11. When the number of persons was 2 or less, visibility was ranked A. When the number of person was from 3 to 5, visibility was ranked B. When the number of person was 6 or more, visibility was ranked C.

Evaluation of Readability

The images illustrated in FIGS. 11 and 12 were each printed on 10 sheets of paper. All the QR codes (registered trademark) formed of IR image in the output image were read by a two-dimensional bar code reader (model number: CM-2D200K2B available from A-POC Corporation, modified with a 870 nm bandpass filter (870 nm BPF manufactured by CERATECH JAPAN Co., Ltd.)). In a case in which all the QR codes (registered trademark) were readable by one scan, readability was ranked A. In a case in which all the QR codes (registered trademark) were readable but some of them needed multiple times of scan, readability was ranked B. In a case in which at least one of the QR codes (registered trademark) was unreadable, readability was ranked C.

Example 13

A printer containing four color toners, i.e., yellow toner, magenta toner, cyan toner, and black toner (manufactured by Ricoh Company, Ltd.) was used. The black toner of the printer was replaced with the IR toner 2, so that a toner set including the IR toner and the color toners was prepared.

The absorbance of each of the color toners (yellow, magenta, and cyan toner) at a wavelength of 800 nm or more was less than 0.01.

As a paper sheet, COATED GLOSSY PAPER (135 g/$m^2$ manufactured by Mondi Group) was used. A solid patch of 5 cm×5 cm was output to the paper sheet using each color toner of the color toner set, and the deposition amount and gloss value of each color toner were measured in the same manner as in the above-described procedure. Measurement results are presented in Table 4.

Next, visibility and readability of the IR toner image were evaluated from the printed matter of FIGS. 10 and 11 in the same manner as in the above-described procedure. The results are presented in Table 4.

Comparative Example 3

The procedure in Example 13 was repeated except for replacing the IR toner 2 with the IR toner 12. The results are presented in Table 4.

Example 14

The procedure in Example 13 was repeated except for replacing the IR toner 2 with the IR toner 13. The results are presented in Table 4.

TABLE 1

| | Developer No. | Addition Amount of Near-infrared Absorbing Material (parts by mass) | Particle Diameter (μm) | *Apparatus and Paper 1 Deposition Amount (mg/$cm^2$) | *Apparatus and Paper 1 Gloss Value of Solid Portion | *Apparatus and Paper 2 Deposition Amount (mg/$cm^2$) | *Apparatus and Paper 2 Gloss Value of Solid Portion | Loss Tangent (tanδi) at 100° C.-140° C. |
|---|---|---|---|---|---|---|---|---|
| IR Toner 1 | 1 | 0.3 | 5.2 | 0.3 | 50 | 0.3 | 90 | 4-10 |
| IR Toner 2 | 2 | 0.6 | 5.2 | 0.35 | 50 | 0.35 | 94 | 4-10 |
| IR Toner 3 | 3 | 1.0 | 5.2 | 0.45 | 50 | 0.45 | 96 | 4-10 |
| IR Toner 4 | 4 | 0.6 | 5.2 | 0.35 | 36 | 0.35 | 58 | 3-8 |
| IR Toner 5 | 5 | 0.6 | 5.2 | 0.35 | 36 | 0.35 | 58 | 3-8 |
| IR Toner 6 | 6 | 0.3 | 6.8 | 0.35 | 34 | 0.35 | 58 | 3-8 |
| IR Toner 7 | 7 | 0.6 | 6.8 | 0.35 | 33 | 0.35 | 57 | 3-8 |
| IR Toner 8 | 8 | 0.6 | 5.2 | 0.35 | 12 | 0.35 | 33 | 0.4-1.2 |
| IR Toner 9 | 9 | 0.6 | 8.0 | 0.35 | 30 | 0.35 | 58 | 3-8 |
| IR Toner 10 | 10 | 0.2 | 5.2 | 0.3 | 51 | 0.3 | 90 | 4-10 |
| IR Toner 11 | 11 | 1.2 | 5.2 | 0.45 | 50 | 0.45 | 62 | 3-8 |

TABLE 1-continued

| | Developer No. | Addition Amount of Near-infrared Absorbing Material (parts by mass) | Particle Diameter (μm) | *Apparatus and Paper 1 Deposition Amount (mg/cm$^2$) | *Apparatus and Paper 1 Gloss Value of Solid Portion | *Apparatus and Paper 2 Deposition Amount (mg/cm$^2$) | *Apparatus and Paper 2 Gloss Value of Solid Portion | Loss Tangent (tanδi) at 100° C.-140° C. |
|---|---|---|---|---|---|---|---|---|
| IR Toner 12 | 12 | 0.6 | 5.2 | 0.35 | 3 | 0.35 | 5 | 0-0.2 |
| IR Toner 13 | 13 | 1.0 | 6.8 | 0.35 | 34 | 0.35 | 58 | 3-8 |
| IR Toner 14 | 14 | 2.0 | 6.8 | 0.4 | 37 | 0.4 | 62 | 3-8 |

TABLE 2

| | *Apparatus and Paper 1 | | | | *Apparatus and Paper 2 | | | |
|---|---|---|---|---|---|---|---|---|
| | Particle Diameter (μm) | Deposition Amount (mg/cm$^2$) | Gloss Value of Solid Portion | Loss Tangent (tanδc) at 100° C.-140° C. | Particle Diameter (μm) | Deposition Amount (mg/cm$^2$) | Gloss value of Solid Portion | Loss Tangent (tanδc) at 100° C.-140° C. |
| Yellow Toner | 6.8 | 0.5 | 18 | 0.4-1.6 | 5.2 | 0.4 | 33 | 0.4-1.2 |
| Magenta Toner | 6.8 | 0.5 | 16 | 0.4-1.6 | 5.2 | 0.4 | 30 | 0.4-1.2 |
| Cyan Toner | 6.8 | 0.5 | 18 | 0.4-1.6 | 5.2 | 0.4 | 34 | 0.4-1.2 |

TABLE 3

| | *Apparatus and Paper | IR Toner | Visibility | Readability | Judgement |
|---|---|---|---|---|---|
| Example 1 | 1 | 1 | A | A | A |
| Example 2 | 1 | 2 | A | A | A |
| Example 3 | 1 | 3 | A | A | A |
| Example 4 | 1 | 4 | A | A | A |
| Example 5 | 1 | 5 | A | A | A |
| Example 6 | 1 | 6 | A | A | A |
| Example 7 | 1 | 7 | A | A | A |
| Example 8 | 1 | 9 | A | B | B |
| Example 9 | 1 | 10 | A | B | B |
| Example 10 | 1 | 11 | B | A | B |
| Comparative Example 1 | 1 | 8 | C | A | C |
| Comparative Example 2 | 1 | 12 | C | C | C |
| Example 11 | 1 | 13 | A | A | A |
| Example 12 | 1 | 14 | A | A | A |

TABLE 4

| | *Apparatus and Paper | IR Toner | Visibility | Readability | Judgement |
|---|---|---|---|---|---|
| Example 13 | 2 | 2 | A | A | A |
| Comparative Example 3 | 2 | 12 | C | C | C |
| Example 14 | 2 | 13 | A | A | A |

In Tables 1 to 4, "*Apparatus and Paper 1" and "*Apparatus and Paper 2" refer to the following combinations of apparatus and paper.

Apparatus and Paper 1: The apparatus is a four-color tandem machine manufactured by Ricoh Co., Ltd. and the paper is plain paper TYPE 6000 (70 W) manufactured by Ricoh Co., Ltd.

Apparatus and Paper 2: The apparatus is a four-color tandem machine manufactured by Ricoh Co., Ltd. and the paper is COATED GLOSSY PAPER.

In Tables 3 and 4, "Judgment" is ranked A when both visibility and readability are ranked A; ranked B when one of visibility and readability is ranked B; and ranked C when one of visibility and readability is ranked C. When "Judgment" is ranked A, it indicates that visibility and readability are good. When "Judgment" is ranked B, it indicates that visibility and readability are insufficient but there is no problem in practical use. When "Judgment" is ranked C, it indicates that visibility and readability are insufficient and there is a problem in practical use.

Embodiments of the present invention provides respective effects as follows.

First Embodiment

A first embodiment of the present invention provides an image forming apparatus (for example, a printer) that forms a color toner image and a special toner image (for example, an IR toner image) with a color toner comprising at least one of yellow toner, magenta toner, and cyan toner and a special toner (for example, an IR toner), respectively, on the same recording medium (for example, a sheet of paper P) and fixes the color toner image and the special toner image on the recording medium by a fixing device (for example, the fixing device 21). The image forming apparatus includes a processor (for example, the processor 30) that performs, in a special image forming operation that forms the color toner image and the special toner image, a toner amount suppression control that makes an amount of the color toner on the recording medium per unit area smaller than that in a normal image forming operation that forms the color toner image without forming the special toner image.

According to the first embodiment, due to the toner amount suppression control, when a color toner image is formed with the color toner and the special toner in the special image forming operation, the amount of the color toner per unit area in the color toner image is made smaller than that in the same color toner image formed without the special toner in the normal image forming operation. This makes it possible to reduce the total amount of toner per unit area in the toner image portion where both the color toner and the special toner are adhered in the special image forming operation and to complete image formation by one time of fixing processing while suppressing defective fixing. Therefore, it is possible to shorten the time required for forming an image with the special toner and the color toner.

Second Embodiment

A second embodiment of the present invention provides the image forming apparatus according to the first embodiment described above in which, when the processor determines in the special image forming operation that a composite toner image comprising the color toner image and the special toner image contains an unfixable portion where a total amount of toner per unit area is in excess of an upper limit (for example, the second specified value) of a fixable amount of toner in one time of fixing processing, the processor performs the toner amount suppression control by executing an image processing (for example, the toner total amount regulation processing) for input image information that reduces the total amount of toner in the unfixable portion to a value not more than the upper limit of the fixable amount of toner.

According to the second embodiment, in the special image forming operation, it is possible to form an image with the total amount of toner per unit area in the unfixable portion be equal to or less than the upper limit of the amount of toner fixable by one time of fixing processing. Therefore, it is possible to complete the image formation by one time of fixing process while suppressing defective fixing.

Third Embodiment

A third embodiment of the present invention provides the image forming apparatus according to the second embodiment described above in which, in the image processing, the amount of the color toner in the unfixable portion is made smaller than that in the normal image forming operation so that the total amount of toner in the unfixable portion is reduced to a value not more than the upper limit of the fixable amount of toner, and the amount of the color toner in a portion other than the unfixable portion is remained the same as that in the normal image forming operation.

According to the third embodiment, since the amount of the color toner in a portion other than the unfixable portion remains the same as that in the normal image forming operation, the image quality in the portion other than the unfixable portion is suppressed from changing.

Fourth Embodiment

A fourth embodiment of the present invention provides the image forming apparatus according to any one of the first to third embodiments describe above, further including a memory (for example, the memory unit 32) that stores normal color conversion data (for example, the color conversion decomposition table) and special color conversion data (for example, the color conversion decomposition table and the toner deposition amount conversion table) used in the normal image forming operation and the toner amount suppression control, respectively, to convert color information of input image information into another color information used for the image forming apparatus. The processor controls the image forming unit to form an image from the input image information converted with the normal color conversion data and the special color conversion data in the normal image forming operation and the toner amount suppression control, respectively.

According to the fourth embodiment, the toner amount suppression control can be performed relatively easily.

Fifth Embodiment

A fifth embodiment of the present invention provides the image forming apparatus according to any one of the first to fourth embodiments described above in which the processor performs, in the special image forming operation, a fixing condition change control that increases a fixing ability of the fixing device and/or lengthens a fixing processing time by the fixing device than those in the normal image forming operation.

According to the fifth embodiment, due to the fixing condition change control, the upper limit of the total amount of toner per unit area fixable by one time of fixing process can be increased. As a result, it is possible to suppress the width of reducing the amount of the color toner per unit area by the toner amount suppression control, thereby suppressing the image quality from changing.

Sixth Embodiment

A sixth embodiment of the present invention provides the image forming apparatus according to the fifth embodiment described above in which the processor performs the fixing condition change control when the processor determines in the special image forming operation that a composite toner image comprising the color toner image and the special toner image contains a toner excess portion where a total amount of toner per unit area is in excess of an upper limit (for example, the first specified value) of an amount of the color toner in the normal image forming operation, and the processor does not perform the fixing condition change control when the processor determines in the special image forming operation that the composite toner image contains no toner excess portion.

According to the sixth embodiment, since the fixing condition change control is not performed when it is determined that a toner excess portion where the total amount of toner per unit area exceeds the upper limit of the amount of the color toner used in the normal image forming operation is not included, adverse effects that may be caused by changing the fixing conditions can be suppressed.

Seventh Embodiment

A seventh embodiment of the present invention provides an image forming apparatus that forms a color toner image and a special toner image with a color toner comprising at least one of yellow toner, magenta toner, and cyan toner and a special toner, respectively, on the same recording medium and fixes the color toner image and the special toner image on the recording medium by a fixing device. The image forming apparatus includes a processor that performs, in a special image forming operation that forms the color toner image and the special toner image, a fixing condition change control that increases a fixing ability of the fixing device and/or lengthens a fixing processing time by the fixing device than those in a normal image forming operation that forms the color toner image without forming the special toner image.

According to the seventh embodiment, due to the fixing condition change control, when a color toner image is formed with the color toner and the special toner in the special image forming operation, the fixing ability is increased and/or the fixing processing time is lengthened than in the case of forming the same color toner image without the special toner in the normal image forming operation. This makes it possible to complete image formation by one time of fixing process while suppressing defective fixing, even when there exists an image portion where the total amount of toner per unit area is too large to be fixable at one time of fixing operation under the fixing conditions in the normal image forming operation. Therefore, it is possible to shorten the time required for forming an image with the special toner and the color toner.

Eighth Embodiment

An eighth embodiment of the present invention provides the image forming apparatus according to the seventh embodiment described above in which the processor performs the fixing condition change control when the processor determines in the special image forming operation that a composite toner image comprising the color toner image and the special toner image contains a toner excess portion where a total amount of toner per unit area is in excess of an upper limit of an amount of the color toner in the normal image forming operation, and the processor does not perform the fixing condition change control when the processor determines in the special image forming operation that the composite toner image contains no toner excess portion.

According to the eighth embodiment, since the fixing condition change control is not performed when it is determined that a toner excess portion where the total amount of toner per unit area exceeds the upper limit of the amount of the color toner used in the normal image forming operation is not included, adverse effects that may be caused by changing the fixing conditions can be suppressed.

Ninth Embodiment

A ninth embodiment of the present invention provides the image forming apparatus according to any one of the first to eighth embodiments described above in which the special toner forms a hardly visible image on the recording medium.

According to the ninth embodiment, it is possible to shorten the time required for forming the hardly visible image.

Tenth Embodiment

A tenth embodiment of the present invention provides the image forming apparatus according to any one of the first to ninth embodiments described above in which the special toner is an infrared absorbing toner (for example, an IR toner) having transparency.

According to the tenth embodiment, it is possible to shorten the time required for forming a hardly visible image with the infrared absorbing toner.

Eleventh Embodiment

An eleventh embodiment of the present invention provides the image forming apparatus according to the tenth embodiment described above in which the color toner comprises a binder resin and a colorant, the infrared absorbing toner comprises a binder resin and a near-infrared absorbing material, and a 60-degree gloss value of a solid image of the infrared absorbing toner is 30 or more and is 10 degrees or more higher than a 60-degree gloss value of a solid image of a color toner forming the visible image.

According to the eleventh embodiment, visibility of a hardly visible image formed with the infrared absorbing toner can be suppressed from increasing.

Twelfth Embodiment

A twelfth embodiment of the present invention provides the image forming apparatus according to the tenth or eleventh embodiment described above in which the infrared absorbing toner comprises a binder resin and a near-infrared absorbing material and has a loss tangent (tan $\delta i$) of 2.5 or more in a temperature range of from 100° C. to 140° C. and the color toner comprises a binder resin and a colorant and has a loss tangent (tan $\delta c$) of 2 or less in a temperature range of from 100° C. to 140° C.

According to the twelfth embodiment, accuracy in reading a hardly visible image formed with the infrared absorbing toner can be reliably secured.

Thirteenth Embodiment

A thirteenth embodiment of the present invention provides the image forming apparatus according to any one of the tenth to twelfth embodiments described above in which the infrared absorbing toner has a weight average particle diameter of from 5 to 7 μm.

According to the thirteenth embodiment, an image formed with the infrared absorbing toner has high image quality.

Fourteenth Embodiment

A fourteenth embodiment of the present invention provides the image forming apparatus according to any one of the tenth to thirteenth embodiments described above in which a solid image of the color toner has an absorbance less than 0.05 at 800 nm or more.

According to the fourteenth embodiment, accuracy in reading a hardly visible image formed with the infrared absorbing toner can be reliably secured.

Fifteenth Embodiment

A fifteenth embodiment of the present invention provides the image forming apparatus according to any one of the tenth to fourteenth embodiments described above in which the special toner image formed with the infrared absorbing toner is disposed closer to the recording medium than the color toner image is.

According to the fifteenth embodiment, visibility of a hardly visible image formed with the infrared absorbing toner can be suppressed from increasing.

Sixteenth Embodiment

A sixteenth embodiment of the present invention provides the image forming apparatus according to the fifteenth embodiment described above in which, when a two-dimensional code image (i) comprising the special toner image and another two-dimensional code image (c) comprising a solid image of the color toner image, each containing different information, are superimposed on one another in the special image forming operation, the solid image of the color toner image has an absorbance less than 0.05 in a range of from 800 to 900 nm.

According to the sixteenth embodiment, accuracy in reading the two-dimensional code image (i) formed with the special toner image can be reliably secured.

Seventeenth Embodiment

A seventeenth embodiment of the present invention provides the image forming apparatus according to any one of the first to sixteenth embodiments described above in which, in the special image forming operation, the processor adjusts an amount of the special toner in the special toner image per unit area to be in a range of from 0.30 to 0.45 $mg/cm^2$ and to be smaller than an amount of the color toner in the color toner image per unit area.

According to the seventeenth embodiment, accuracy in reading a hardly visible image can be reliably secured.

Eighteenth Embodiment

An eighteenth embodiment of the present invention provides an image forming apparatus that forms a color toner image and a special toner image with a color toner comprising at least one of yellow toner, magenta toner, and cyan toner and a special toner, respectively, on the same recording medium and fixes the color toner image and the special toner image on the recording medium by a fixing device, in which a black image formed of both of the color toner image and the special toner image has a lower image density than another black image formed of the color toner image only.

According to the eighteenth embodiment, when a black image is formed with the color toner and the special toner, the amount of the color toner per unit area in the black image is made smaller than that in the same black image formed without the special toner. This makes it possible to reduce the total amount of toner per unit area in the toner image portion where both the color toner and the special toner are adhered and to complete image formation by one time of fixing processing while suppressing defective fixing. Therefore, it is possible to shorten the time required for forming an image with the special toner and the color toner.

Other Embodiments

Another embodiment of the present invention provides an image forming method that forms a color toner image and a special toner image with a color toner comprising at least one of yellow toner, magenta toner, and cyan toner and a special toner, respectively, on the same recording medium and fixes the color toner image and the special toner image on the recording medium by a fixing device, in which, in a special image forming operation that forms the color toner image and the special toner image, a toner amount suppression control that makes an amount of the color toner on the recording medium per unit area smaller than that in a normal image forming operation that forms the color toner image without forming the special toner image.

Another embodiment of the present invention provides an image forming method that forms a color toner image and a special toner image with a color toner comprising at least one of yellow toner, magenta toner, and cyan toner and a special toner, respectively, on the same recording medium and fixes the color toner image and the special toner image on the recording medium by a fixing device, in which, in a special image forming operation that forms the color toner image and the special toner image, a fixing condition change control that increases a fixing ability of the fixing device and/or lengthens a fixing processing time by the fixing device than those in a normal image forming operation that forms the color toner image without forming the special toner image.

Another embodiment of the present invention provides an image forming method that forms a color toner image and a special toner image with a color toner comprising at least one of yellow toner, magenta toner, and cyan toner and a special toner, respectively, on the same recording medium and fixes the color toner image and the special toner image on the recording medium by a fixing device, in which a black image formed of both of the color toner image and the special toner image has a lower image density than another black image formed of the color toner image only.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:

an image forming unit containing:

a color toner comprising at least one of yellow toner, magenta toner, and cyan toner; and a special toner, the image forming unit configured to perform:

a special image forming operation that forms a color toner image and a special toner image with the color toner and the special toner, respectively, on a recording medium; and a normal image forming operation that forms the color toner image without forming the special toner image on the recording medium;

a fixing device configured to fix the color toner image and the special toner image on the recording medium; and circuitry configured to perform, in the special image forming operation, a toner amount suppression control that makes an amount of the color toner on the recording medium per unit area smaller than that in the normal image forming operation, wherein, when the circuitry determines in the special image forming operation that a composite toner image comprising the color toner image and the special toner image contains a first specified value corresponding to a total amount of toner per unit area is in excess of an upper limit of a fixable amount of toner, the circuitry performs the toner amount suppression control when the total amount of toner exceeds a second specified value that is higher than the first specified value.

2. The image forming apparatus of claim 1, wherein, when the circuitry determines in the special image forming operation that a composite toner image comprising the color toner image and the special toner image contains an unfixable portion where a total amount of toner per unit area is in excess of an upper limit of a fixable amount of toner in one time of fixing processing, the circuitry performs the toner amount suppression control by executing an image processing for input image information that reduces the total amount of toner in the unfixable portion to a value not more than the upper limit of the fixable amount of toner.

3. The image forming apparatus of claim 2, wherein the image processing causes:

the amount of the color toner in the unfixable portion be smaller than that in the normal image forming operation; and the amount of the color toner in a portion other than the unfixable portion remain the same as that in the normal image forming operation.

4. The image forming apparatus of claim 1, further comprising:

a memory that stores normal color conversion data and special color conversion data used in the normal image forming operation and the toner amount suppression control, respectively, to convert color information of input image information into another color information used for the image forming apparatus, wherein the circuitry controls the image forming unit to form an image from the input image information converted with the normal color conversion data and the special color conversion data in the normal image forming operation and the toner amount suppression control, respectively.

5. The image forming apparatus of claim 1, wherein the circuitry is further configured to perform, in the special image forming operation, a fixing condition change control that includes at least one of increasing a fixing ability of the fixing device and lengthening a fixing processing time by the fixing device than those in the normal image forming operation.

6. The image forming apparatus of claim 5, wherein the circuitry performs the fixing condition change control when the circuitry determines in the special image forming operation that a composite toner image comprising the color toner image and the special toner image contains a toner excess portion where a total amount of toner per unit area is in excess of an upper limit of an amount of the color toner in the normal image forming operation, wherein the circuitry does not perform the fixing condition change control when the circuitry determines in the special image forming operation that the composite toner image contains no toner excess portion.

7. The image forming apparatus of claim 1, wherein the special toner forms a hardly visible image on the recording medium.

8. The image forming apparatus of claim 1, wherein the special toner is an infrared absorbing toner having transparency.

9. The image forming apparatus of claim 8, wherein the color toner comprises a binder resin and a colorant, wherein the infrared absorbing toner comprises a binder resin and a near-infrared absorbing material, wherein a 60-degree gloss value of a solid image of the infrared absorbing toner is 30 or more and is 10 degrees or more higher than a 60-degree gloss value of a solid image of the color toner.

10. The image forming apparatus of claim 8, wherein the infrared absorbing toner comprises a binder resin and a near-infrared absorbing material, and has a loss tangent (tan $\delta i$) of 2.5 or more in a temperature range of from 100° C. to 140° C., wherein the color toner comprises a binder resin and a colorant, and has a loss tangent (tan $\delta c$) of 2 or less in a temperature range of from 100° C. to 140° C.

11. The image forming apparatus of claim 8, wherein the infrared absorbing toner has a weight average particle diameter of from 5 to 7 μm.

12. The image forming apparatus of claim 8, wherein a solid image of the color toner has an absorbance less than 0.05 at 800 nm or more.

13. The image forming apparatus of claim 8, wherein the special toner image formed with the infrared absorbing toner is disposed closer to the recording medium than the color toner image is.

14. The image forming apparatus of claim 13, wherein, when a two-dimensional code image comprising the special toner image and another two-dimensional code image comprising a solid image of the color toner image, each containing different information, are superimposed on one another in the special image forming operation, the solid image of the color toner image has an absorbance less than 0.05 in a range of from 800 to 900 nm.

15. The image forming apparatus of claim 1, wherein, in the special image forming operation, the circuitry adjusts an amount of the special toner in the special toner image per unit area to be in a range of from 0.30 to 0.45 mg/cm2 and to be smaller than an amount of the color toner in the color toner image per unit area.

16. The image forming apparatus of claim 1, further comprising four toner stations respectively containing yellow toner, magenta toner, cyan toner, and special toner.

17. The image forming apparatus of claim 16, wherein the circuitry is further configured to control the image forming unit to form a black image with the yellow, magenta, and cyan toners.

18. An image forming apparatus comprising:

an image forming unit containing:

a color toner comprising at least one of yellow toner, magenta toner, and cyan toner; and a special toner, the image forming unit configured to perform:

a special image forming operation that forms a color toner image and a special toner image with the color toner and the special toner, respectively, on a recording medium; and a normal image forming operation that forms the color toner image without forming the special toner image on the recording medium;

a fixing device configured to fix the color toner image and the special toner image on the recording medium; and circuitry configured to perform, in the special image forming operation, a toner amount suppression control that makes an amount of the color toner on the recording medium per unit area smaller than that in the normal image forming operation, wherein, when the circuitry determines in the special image forming operation that a composite toner image comprising the color toner image and the special toner image contains an unfixable portion where a total amount of toner per unit area is in excess of an upper limit of a fixable amount of toner in one time of fixing processing, the circuitry performs the toner amount suppression control by executing an image processing for input image information that reduces the total amount of toner in the unfixable portion to a value not more than the upper limit of the fixable amount of toner.

* * * * *